United States Patent
Sato

(10) Patent No.: US 6,577,370 B1
(45) Date of Patent: Jun. 10, 2003

(54) NARROW-PITCH CONNECTOR, PITCH CONVERTER, MICROMACHINE, PIEZOELECTRIC ACTUATOR, ELECTROSTATIC ACTUATOR, INK-JET HEAD, INK-JET PRINTER, LIQUID CRYSTAL DEVICE, AND ELECTRONIC APPARATUS

(75) Inventor: Eiichi Sato, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/701,343

(22) PCT Filed: Mar. 31, 2000

(86) PCT No.: PCT/JP00/02070

§ 371 (c)(1),
(2), (4) Date: Dec. 13, 2000

(87) PCT Pub. No.: WO00/58204

PCT Pub. Date: Oct. 5, 2000

(30) Foreign Application Priority Data

Mar. 31, 1999 (JP) ............................................. 11-094070

(51) Int. Cl.$^7$ ............................................ G02F 1/1336
(52) U.S. Cl. ...................................... 349/149; 349/150
(58) Field of Search ................................ 349/149, 150; 174/268

(56) References Cited

U.S. PATENT DOCUMENTS

| 5,668,700 A | * | 9/1997 | Tagusa et al. ............... 349/150 |
| 5,680,191 A | * | 10/1997 | Voisin et al. ................ 349/150 |
| 5,768,105 A | * | 6/1998 | Aota et al. ................... 174/254 |
| 5,838,412 A | | 11/1998 | Ueda et al. |
| 6,184,965 B1 | * | 2/2001 | Murayama et al. ......... 379/150 |
| 6,191,838 B1 | * | 2/2001 | Muramatsu ................. 349/149 |
| 6,300,997 B1 | * | 10/2001 | Saito et al. ................. 349/149 |

FOREIGN PATENT DOCUMENTS

| EP | 0 460 668 A2 | 12/1991 |
| EP | 0 836 228 A2 | 4/1998 |
| EP | 0 860 279 A1 | 8/1998 |
| JP | 59-8384 | 1/1984 |
| JP | 5-174890 | 7/1993 |
| JP | 10-193596 | 7/1998 |

\* cited by examiner

Primary Examiner—James Dudek
(74) Attorney, Agent, or Firm—Oliff & Berridge PLC

(57) ABSTRACT

A narrow-pitch connector; a pitch converter; a micromachine; a piezoelectric actuator; an electrostatic actuator; an ink jet head; an ink jet printer; a liquid crystal device; and electronic equipment in which the positional deviation between terminal electrodes to be connected with each other can be reduced even if thermal stress is applied, and in which effective heat radiation from a semiconductor device mounted thereon can be achieved.

A plurality of first terminal electrodes (30) and a plurality of second terminal electrodes (32) are formed on a substrate. First wiring (24A) connected with the first terminal electrodes (30) and second wiring (24B) connected with the second terminal electrodes (32) are formed. A semiconductor device (33), which is electrically connected with the first wiring (24A) and the second wiring (24B), is provided. The pitch among the first terminal electrodes is set to be narrower than the pitch among the second terminal electrodes, and the number of the first terminal electrodes is set to be larger than the number of the second terminal electrodes.

16 Claims, 17 Drawing Sheets

(a)

(b)

(a)

(b)

(c)

(a)

(b)

NARROW-PITCH CONNECTOR, PITCH CONVERTER, MICROMACHINE, PIEZOELECTRIC ACTUATOR, ELECTROSTATIC ACTUATOR, INK-JET HEAD, INK-JET PRINTER, LIQUID CRYSTAL DEVICE, AND ELECTRONIC APPARATUS

TECHNICAL FIELD

The present invention relates to a narrow-pitch connector for connecting terminals with each other, a pitch converter, a micro-machine, a piezoelectric actuator, an electrostatic actuator, an ink et head, an ink jet printer, a liquid crystal device electronic equipment.

BACKGROUND ART

Recently, electronic equipment has been developed remarkably, and the degree of integration per unit area has been enhanced as the electronic equipment has been made smaller in size, lighter in weight and larger in capacity. In the present circumstances, however, the technical advance of peripheral portions of the electronic equipment lags behind relatively, and there is no proposal particularly to make terminal electrodes of a connection portion finer.

Connecting subjects such as printer heads (hereinafter referred to as "printer engine portions") having piezoelectric elements for blasting ink by the vibration of the piezoelectric elements, LCD cells of liquid crystal devices, or the like, have been made finer year by year, so that the interval between terminal electrodes has become narrower correspondingly. To connect a driving circuit to such a connecting subject, a tape carrier package is hitherto attached to convert the pitch of a wiring pattern so as to make a connection with the driving circuit.

This connection will be described in detail with reference to the drawings. FIG. 17 is a main portion enlarged view of a connecting subject and a tape carrier package. As shown in FIG. 17, in a connecting subject 1 such as a printer engine portion, an LCD cell of a liquid crystal device, or the like, a plurality of wirings 2 connected with elements are drawn around on the surface of the connecting subject 1, and terminal electrodes 3 are formed in end portions of the connecting subject 1.

On the other hand, a tape carrier package 4 for making a connection with the connecting subject 1 is formed of a flexible substrate the material of which is composed of polyimide. Terminal electrodes 5 which can be put on the terminal electrodes 3 respectively formed in the end portions of the connecting subject 1 are formed at one end of this substrate while terminal electrodes 6 which are wider than the terminal electrodes 5 and which are disposed at larger intervals than the terminal electrodes 5 are formed in the end portion opposite to the terminal electrodes 5. A semiconductor device 6A for driving the connecting subject 1 is provided between the terminal electrodes 5 and the terminal electrodes 6. This semiconductor device 6A is received in a hole portion (device hole) which is provided in a substantially central portion of the tape carrier package 4. The other end portions of wirings constituting the terminal electrodes 5 and the terminal electrodes 6 are made to project from the hole portion so as to form inner leads. The inner leads are connected with terminals provided in the semiconductor device 6A so that the terminal electrodes 5 and the terminal electrodes 6 are made electrically conductive with the semiconductor device 6A.

FIG. 18 is an explanatory view showing the process of connecting the connecting subject 1 with the tape carrier package 4. As shown in FIG. 18, in the case where the aforementioned connecting subject 1 and the aforementioned tape carrier package 4 are connected with each other, the connecting subject 1 is first disposed on a bonding stage 7 so that the terminal electrodes 3 are located on the upper surface side. Next, positioning is performed between the terminal electrodes 5 provided on the tape carrier package 4 and the aforementioned terminal electrodes 3 so that both the terminal electrodes are put on top of each other. Incidentally, a bonding agent containing electrically conductive particles are applied between the terminal electrodes 3 and the terminal electrodes 5 so that both the terminal electrodes are made electrically conductive with each other through the electrically conductive particles.

Here, a bonding tool 8 which can move up and down is provided above the position where both the electrodes are put on top of each other, that is, above the terminal electrodes 5 in the tape carrier package 4. Incidentally, the bonding tool 8 includes a heater 9 so that a front end portion of the bonding tool 8 can be heated by operating this heater 9.

By moving down the bonding tool 8 configured thus, both the electrodes are connected with each other while not only is it intended to bring both the electrodes into close contact with the electrically conductive particles but also it is intended to shorten the time to dry the bonding agent by heating. Incidentally, when both the electrodes are connected with each other, the bonding agent containing electrically conductive particles is not always required. Both the electrodes may be welded or metal-bonded by applying pressure and heat to the electrodes which are put on top of each other without using any bonding agent.

Incidentally, although a printer head (printer engine portion) using a piezoelectric element or an LCD cell of a liquid crystal device was described here by way of example, bonding may be performed by a similar technique also in a micro-machine in which a fine moving mechanism portion is formed on a substrate and a wiring for transferring energy (for applying a voltage) to this moving mechanism portion is extracted, a piezoelectric actuator using a piezoelectric element, an electrostatic actuator using an electrostatic vibrator, a printer head using an electrostatic actuator, a printer using such actuators, and electronic equipment mounted with such apparatus.

However, in the tape carrier package or the terminal electrode connecting method described above, there have been technical problems as follows.

FIGS. 19(*a*) and (*b*) show sectional views respectively taken on line C—C in FIG. 18, in which an interval 10 between the terminal electrodes 3 is made narrower correspondingly to the fact that the connecting subject 1 such as a printer engine portion, an LCD cell of a liquid crystal device, or the like, has been made finer year by year as described above. As a result, if the material composing the connecting subject 1 (mainly silicon) and the material composing the tape carrier package 4 (mainly polyimide) are different in thermal expansion coefficient, the thermal expansion of the tape carrier package 4 becomes larger due to the influence of the heater 9 included in the bonding tool 8 when the bonding tool 8 is made close to the connecting subject 1 and the tape carrier package 4 in order to bond them. As a result, as shown in FIG. 19(*b*), the terminal electrodes 5 are displaced relatively to the terminal electrodes 3 respectively. Thus, there has been a fear that there arises a problem such as increase in resistance value or failure in bonding between both the terminals, or short-circuit with adjacent terminals. Incidentally, according to various investigations made by the present inventor, it was confirmed that there was a limit of a wiring pitch near 60 $\mu$m in a tape carrier package made of polyimide material.

Incidentally, the semiconductor device 6A provided in the inside of the tape carrier package 4 is not in tight contact with the tape carrier package 4. Therefore, there has been a problem that the semiconductor device 6A has no effect of heat transfer to the tape carrier package 4, so that the heat radiation from the semiconductor device 6A is not performed effectively. In addition, the inner leads which will be wiring end portions project from the device hole, and are connected with the terminals of the semiconductor device 6A so as to make an electric connection with the semiconductor device 6A. However, the inner leads also have a function to mechanically hold the semiconductor device in the device hole. Therefore, if the semiconductor device 6A moves in the device hole (due to external force or the like), there has been a fear that the inner leads adjacent to each other abut against each other so as to cause an obstruction such as short-circuit or the like. Therefore, in order to protect the inner leads, application of sealer to the semiconductor device 6A and the inner leads is required after they are bonded with each other, so that the circumference of the device hole including the semiconductor device 6A are sealed. That is, a drying/solidifying process is required for solidifying the sealer. Thus, the increase of the manufacturing process has come into problem.

On the other hand, in an actuator, or the like, manufactured by use of a micro-machine or micro-machining technique, it has been inevitable that the area of wiring terminals increases in comparison with a moving mechanism portion or an actuator portion because the actuator is connected with an external board by a method of flexible-substrate or wire bonding, wire cable soldering, or the like. In order to form such a moving mechanism portion or such an actuator, precise machining represented by anisotropic etching is required, and an expensive material or an expensive machine is also required. It is therefore desired that the area of wiring terminal portions is made so minimal that the moving mechanism portion or actuator is manufactured efficiently.

DISCLOSURE OF THE INVENTION

It is an object of the present invention to provide a narrow-pitch connector in which the positional deviation between terminal electrodes to be connected with each other can be reduced even if thermal stress is applied, in which effective heat radiation from a semiconductor device mounted on the connector can be achieved and which can be manufactured easily; a pitch converter; a micro-machine; a piezoelectric actuator; an electrostatic actuator; an ink jet head; an ink jet printer; a liquid crystal device; and electronic equipment.

(1) According to an aspect of the present invention, there is provided a narrow-pitch connector in which a plurality of first terminal electrodes and a plurality of second terminal electrodes are formed on a substrate, and a first wiring connected with the first terminal electrodes and a second wiring connected with the second terminal electrodes are formed; wherein the narrow-pitch connector comprises a semiconductor device which is electrically connected with the first wiring and the second wiring, a pitch of the first terminal electrodes is narrower than a pitch of the second terminal electrodes, and the number of the first terminal electrodes is larger than the number of the second terminal electrodes.

(2) According to another aspect of the present invention, in the narrow-pitch connector stated in the above paragraph (1), the substrate is formed of silicon.

(3) According to another aspect of the present invention, in the narrow-pitch connector stated in the above paragraph (1), the semiconductor device is disposed so that long sides of the semiconductor device are put substantially in parallel with an alignment direction of the first terminal electrodes.

(4) According to another aspect of the present invention, in the narrow-pitch connector stated in the above paragraph (1), the semiconductor device is disposed so that short sides of the semiconductor device are put substantially in parallel with an alignment direction of the first terminal electrodes.

(5) According to another aspect of the present invention, in the narrow-pitch connector stated in the above paragraph (1), an insulating layer is provided on the substrate so as to be formed at least in an area where the semiconductor device is disposed, and the first wiring and the second wiring are formed on the insulating layer.

In the respective inventions of the above paragraphs (1) to (5), if silicon is used as the material for the substrate of the narrow-pitch connector, the narrow-pitch connector can be formed of a material the thermal expansion coefficient of which is smaller than that of a material of a flexible substrate, and further in the same manner as the process for forming a semiconductor device. In addition, the wirings with a narrow pitch can be formed easily. Further, silicon is so high in heat conductivity that the effect of heat radiation can be enhanced. Therefore, the narrow-pitch connector can be prevented from temperature rising due to heat generated in the semiconductor device.

In addition, the semiconductor device may be disposed so that the long sides of the semiconductor device are substantially parallel with the alignment direction of the first terminal electrodes, or disposed so that the short sides of the semiconductor device are substantially parallel with the alignment direction of the first terminal electrodes. In the latter case, the width of the narrow-pitch connector can be reduced.

In addition, because the semiconductor device adheres closely onto the substrate of the narrow-pitch connector through an insulating layer, even if heat is generated in the semiconductor device, the heat generated in the semiconductor device is transferred to the substrate and then radiated from the substrate. Thus, not only the surface of the semiconductor device but also the surface of the substrate serve for heat radiation. Accordingly, even if the heating value of the semiconductor device is large, heat radiation can be performed satisfactorily. Further, because the substrate can be made to hold the semiconductor device, it becomes easy to ensure the mechanical strength.

In addition, the respective electrodes of the semiconductor device are connected to wirings along (in tight contact with) the surface of the substrate differently from inner leads which are cantilever-supported. Accordingly, there is no fear that the semiconductor device moves after connection. As a result, application of sealer to the semiconductor device is not required. Thus, not only is it possible to eliminate a drying process and so on, but also there is no fear that short-circuit is caused between terminals due to the movement of the semiconductor device.

(6) According to another aspect of the present invention, there is provided a pitch converter comprising: a narrow-pitch connector in which a plurality of first terminal electrodes and a plurality of second terminal electrodes are formed on a substrate, and a first wiring connected with the first terminal electrodes and a second wiring connected with the second terminal electrodes are formed; and a connecting subject having external terminal electrodes electrically connected with the first terminal electrodes; wherein a semiconductor device electrically connected with the first wiring and the second wiring is provided, a pitch of the first terminal electrodes is narrower than a pitch of the second terminal electrodes, and the number of the first terminal electrodes is larger than the number of the second terminal electrodes.

(7) According to another aspect of the present invention, in the above pitch converter, the substrate has a characteristic that a thermal expansion coefficient thereof is substantially equal to or smaller than a thermal expansion coefficient of the connecting subject.

(8) According to another aspect of the present invention, in the above pitch converter, the substrate and the connecting subject are formed of one and the same material.

(9) According to another aspect of the present invention, in the above pitch converter, the substrate and the connecting subject are formed of silicon.

(10) According to another aspect of the present invention, in the above pitch converter, the first terminal electrodes are electrically connected with the external terminal electrodes through electrically conductive members.

In the respective inventions of the above paragraphs (6) to (10), the substrate of the narrow-pitch connector has a characteristic that the thermal expansion coefficient of the substrate is substantially equal to or smaller than that of the connecting subject. Accordingly, when the first terminal electrodes of the connector and the external terminal electrodes of the connecting subject are connected with each other by pressing and heating, both the electrodes are lengthened by substantially the same quantity so that the relative positional deviation of the electrodes which are put on top of each other can be restrained to the minimum.

In addition, because the substrate of the narrow-pitch connector and the connecting subject are formed of the same material, the relative positional deviation of the electrodes can be restrained when the electrodes are put on top of each other.

Further, because silicon which is high in heat conductivity is used as the material of the substrate of the narrow-pitch connector and the connecting subject, the effect of heat radiation can be more enhanced so that the resistance value can be prevented from increasing due to temperature rising.

Moreover, because the first terminal electrodes of the connector and the external terminal electrodes of the connecting subject are connected with each other through the electrically conductive members, the electric connection between both the electrodes can be made more reliable. Incidentally, for example, if an anisotropic conductive film made by forming an anisotropic conductive bonding agent into a thin film is used as the electrically conductive members, the electrically conductive members can be prevented from projecting from the bonding portion.

(11) According to another aspect of the present invention, there is provided a micro-machine comprising a first substrate in which a moving mechanism portion and a plurality of external terminal electrodes are formed, and a second substrate in which first terminal electrodes for making electric connection with the plurality of external terminal electrodes are formed; wherein the second substrate has a plurality of second terminal electrodes, first wiring connected with the first terminal electrodes, second wiring connected with the second terminal electrodes, and a semiconductor device connected with the first wiring and the second wiring; and wherein a pitch of the first terminal electrodes is narrower than a pitch of the second terminal electrodes, and the number of the first terminal electrodes is larger than the number of the second terminal electrodes.

In the invention of the above paragraph (11), in the micro-machine, the first substrate in which the moving mechanism portion of the micro-machine is formed and the second substrate for making a connection with the outside are formed separately. Accordingly, the area of the first substrate can be minimized.

(12) According to another aspect of the present invention, there is provided a piezoelectric actuator comprising a first substrate in which a piezoelectric element and a plurality of external terminal electrodes are formed, and a second substrate having first terminal electrodes for making electric connection with the plurality of external terminal electrodes; wherein the second substrate has a plurality of second terminal electrodes, first wiring connected with the first terminal electrodes, second wiring connected with the second terminal electrodes, and a semiconductor device connected with the first wiring and the second wiring; and wherein a pitch of the first terminal electrodes is narrower than a pitch of the second terminal electrodes, and the number of the first terminal electrodes is larger than the number of the second terminal electrodes.

(13) According to another aspect of the present invention, there is provided an electrostatic actuator comprising a first substrate in which an electrostatic vibrator and a plurality of external terminal electrodes are formed, and a second substrate having first terminal electrodes for making electric connection with the plurality of external terminal electrodes; wherein the second substrate has a plurality of second terminal electrodes, first wiring connected with the first terminal electrodes, second wiring connected with the second terminal electrodes, and a semiconductor device connected with the first wiring and the second wiring; and wherein a pitch of the first terminal electrodes is narrower than a pitch of the second terminal electrodes, and the number of the first terminal electrodes is larger than the number of the second terminal electrodes.

(14) According to another aspect of the present invention, there is provided an ink jet head including the piezoelectric actuator stated in the above paragraph (12).

(15) According to another aspect of the present invention, there is provided an ink jet head including the electrostatic actuator stated in the above paragraph (13).

(16) According to another aspect of the present invention, there is provided an ink jet printer including an ink jet head stated in the above paragraph (14).

(17) According to another aspect of the present invention, there is provided an ink jet printer including an ink jet head stated in the above paragraph (15).

In the respective inventions of the above paragraphs (12), (14) and (16), the first substrate in which a piezoelectric element is formed and the second substrate for making a connection with the outside are formed separately. Accordingly, the area of the first substrate can be minimized.

On the other hand, in the respective inventions of the above paragraphs (13), (15) and (17), the first substrate in which an electrostatic vibrator is formed and the second substrate for making a connection with the outside are formed separately. Accordingly, the area of the first substrate can be minimized.

(18) According to another aspect of the present invention, there is provided a liquid crystal device in which a liquid crystal is held between a first substrate and a second substrate and in which a plurality of external terminal electrodes are formed on one of the first and second substrates; wherein a third substrate having first terminal electrodes for making electric connection with the plurality of external terminal electrodes is provided; wherein the third substrate has a plurality of second terminal electrodes, first wiring connected with the first terminal electrodes, second wiring connected with the second terminal electrodes, and a semiconductor device connected with the first wiring and the second wiring; and wherein a pitch of the first terminal electrodes is narrower than a pitch of the second terminal electrodes, and the number of the first terminal electrodes is larger than the number of the second terminal electrodes.

In the invention of the above paragraph (18), the so-called liquid crystal cell in which the liquid crystal is held between the first substrate and the second substrate and in which a plurality of external terminal electrodes are formed in one of the first and second substrates, and the third substrate for making a connection with the outside are formed separately. Accordingly, the area occupied by the external terminal electrodes in the liquid crystal cell can be minimized. Therefore, a large liquid crystal display portion can be ensured in the liquid crystal cell even if the liquid crystal cell having the same area as that of a background-art one is used. In addition, because the number of terminals in a connecting portion can be increased easily, the pitch of picture elements can be reduced so that the picture elements can be made precise extremely.

(19) According to another aspect of the present invention, there is provided an electronic equipment comprising a liquid crystal device; wherein the liquid crystal device is arranged so that a liquid crystal is held between a first substrate and a second substrate and a plurality of external terminal electrodes are formed on one of the first and second substrates; wherein a third substrate having first terminal electrodes for making electric connection with the plurality of external terminal electrodes is provided; wherein the third substrate has a plurality of second terminal electrodes, first wiring connected with the first terminal electrodes, second wiring connected with the second terminal electrodes, and a semiconductor device connected with the first wiring and the second wiring; and wherein a pitch of the first terminal electrodes is narrower than a pitch of the second terminal electrodes, and the number of the first terminal electrodes is larger than the number of the second terminal electrodes.

In the invention of the above paragraph (19), the electronic equipment has the liquid crystal device which comprises the so-called liquid crystal cell, in which the liquid crystal is held between the first substrate and the second substrate and in which a plurality of external terminal electrodes are formed in one of the first and second substrates, and the third substrate for making a connection with the outside, and the liquid crystal cell and the third substrate are formed separately. Accordingly, the area occupied by the external terminal electrodes in the liquid crystal cell can be minimized. As a result, miniaturization of the electronic equipment becomes easy.

THE BEST MODE FOR CARRYING OUT THE INVENTION

Embodiment 1

Figure 1:
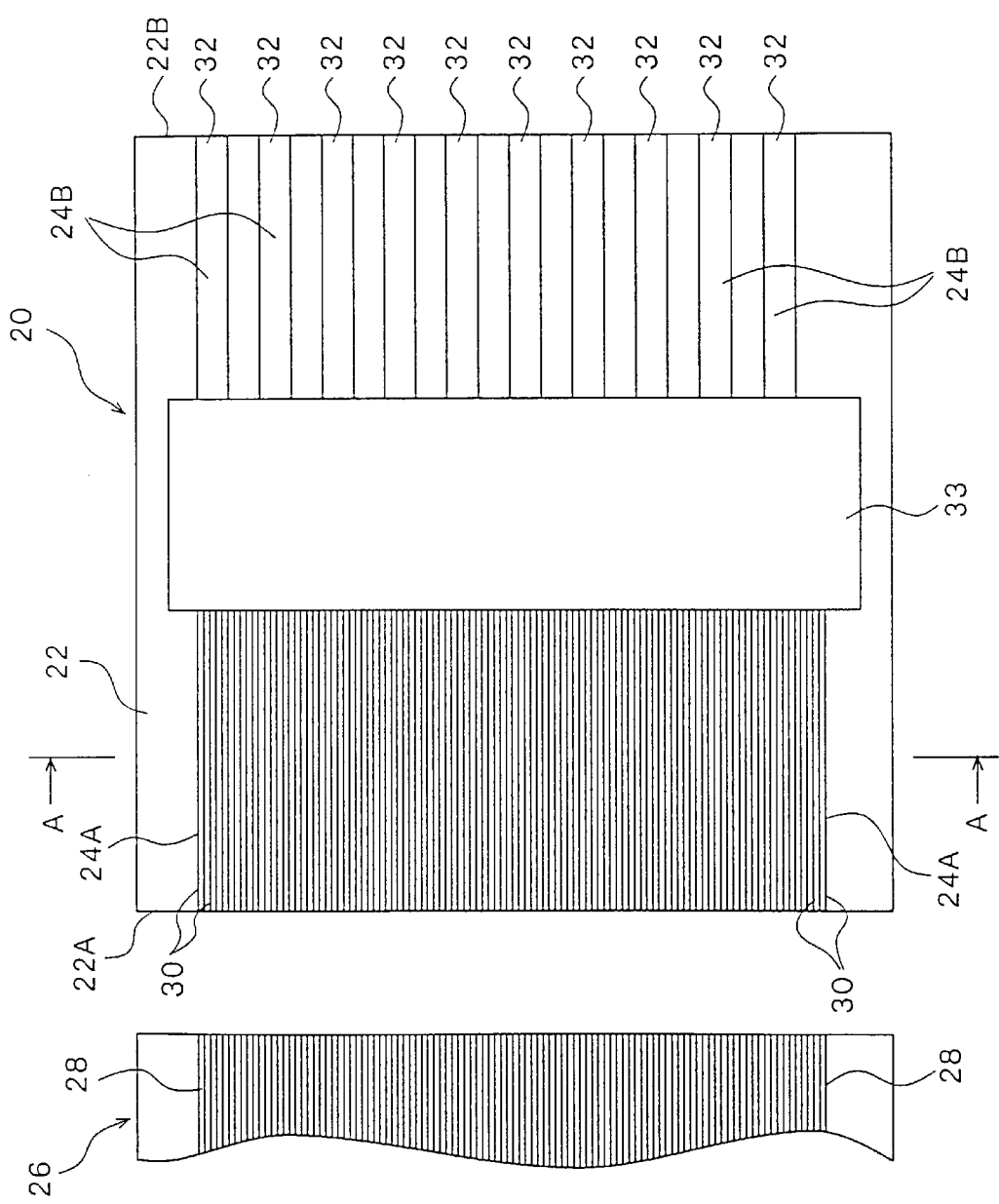
FIG. 1 is a front view showing a pitch converter according to Embodiment 1 of the present invention, showing a narrow-pitch connector and a terminal portion of a connecting subject to which this connector is connected.

FIG. 1 is a front view showing a pitch converter according to this embodiment, and illustrating an example of a narrow-pitch connector and a terminal portion of a connecting subject which is to be connected to this connector. As shown in FIG. 1, a narrow-pitch connector 20 according to this embodiment has a configuration in which metal wirings 24 are formed on the surface of a substrate 22.

The substrate 22 is composed of rectangular single crystal silicon, and manufactured by cutting a semiconductor wafer into pieces of a lattice so that a semiconductor device is to be formed on the surface of each piece. A plurality of metal wirings 24A and a plurality of metal wirings 24B are provided on the surface of the substrate 22 so as to cross the substrate 22. Terminal electrodes 30 as bonding portions which can be put on terminal electrodes 28 provided on a connecting subject 26 are formed in one-side end portions of the metal wirings 24 respectively, that is, in an end portion 22A of the substrate 22. That is, the terminal electrodes 30 are set to have the same pitch (pitch of not larger than 60 $\mu$m) as the pitch of the terminal electrodes 28. On the other hand, in an end portion 22B of the connector body 22 opposite to the terminal electrodes 30, terminal electrodes 32 the number of which is smaller than the number of the terminal electrodes 30 but the width and pitch of which are enlarged (pitch of not smaller than 80 $\mu$m) are formed. In addition, a semiconductor device 33 for driving elements of the connecting subject 26 is mounted on a central portion of the substrate 22 so that the semiconductor device 33 is disposed to be long from side to side, that is, the long sides of the semiconductor device 33 are set substantially in parallel with the terminal alignment direction of the connecting subject 26. Incidentally, the end portions of the metal wirings 24A opposite to the terminal electrodes 30 and the end portions of the metal wirings 24B opposite to the terminal electrodes 32 are located in the electrode positions of the semiconductor device 33. Thus, both the end portions of the metal wirings 24A and 24B are connected with the electrodes of the semiconductor device 33 so that the terminals of the semiconductor device 33, the metal wirings 24A and the metal wirings 24B are made electrically conductive with one another.

Thus, the semiconductor device 33 is disposed in tight contact with the surface of the substrate 22. Accordingly, when heat is generated in the semiconductor device 33, this generated heat is transferred to the substrate 22, and the substrate 22 plays the role of a radiator plate (heat sink). As a result, even if the heating value of the semiconductor device 33 increases, the substrate 22 efficiently radiates the heat generated in the semiconductor device 33, so that the semiconductor device 33 can be driven stably.

Further, the dead weight of the semiconductor device 33 is held by the substrate 22, and the electrodes provided in the semiconductor device 33 are connected with the metal wirings 24A and 24B formed tightly on the surface of the substrate 22. Thus, even if external force is applied to the semiconductor device 33, there is no fear that the semiconductor device 33 is moved by the external force. As a result, a sealer applying process, a sealer drying process, or the like, for settling down the circumferences of the electrodes of the semiconductor device 33 with sealer in order to prevent short-circuit, becomes unnecessary, so that the manufacturing process is simplified.

In addition, because the semiconductor device 33 is mounted inside the substrate 22, it becomes unnecessary to mount the semiconductor device 33 in front of or at rear of the narrow-pitch connector, that is, on the connecting subject 26 or on an external substrate such as a flexible substrate connected to the terminal electrodes 32. As a result, the mounting area can be reduced, so that the narrow-pitch connector itself can be miniaturized.

In addition, because the semiconductor device 33 is disposed so that the long sides of the semiconductor device 33 are substantially in parallel with the terminal alignment direction of the connecting subject 26, the lengths of the respective electrodes to the semiconductor device 33 become equal to one another, so that the resistant value of the wiring pattern can be made uniform.

In addition, the number of the connecting subjects 26 which can be produced from one semiconductor wafer can be increased, so that the manufacturing efficiency can be improved and the manufacturing cost can be reduced.

Incidentally, in the connecting subject 26 where the terminal electrodes 28 are formed, for example, a piezoelectric element is provided on a silicon substrate composed of the same material as that of the substrate 22. Thus, the connecting subject 26 is provided as a printer head (hereinafter referred to as "printer engine portion") for blasting ink by vibration of the piezoelectric element. By applying a voltage to the terminal electrodes 28, the piezoelectric element provided on the connecting subject 26 can be operated (vibrated).

Figure 2:
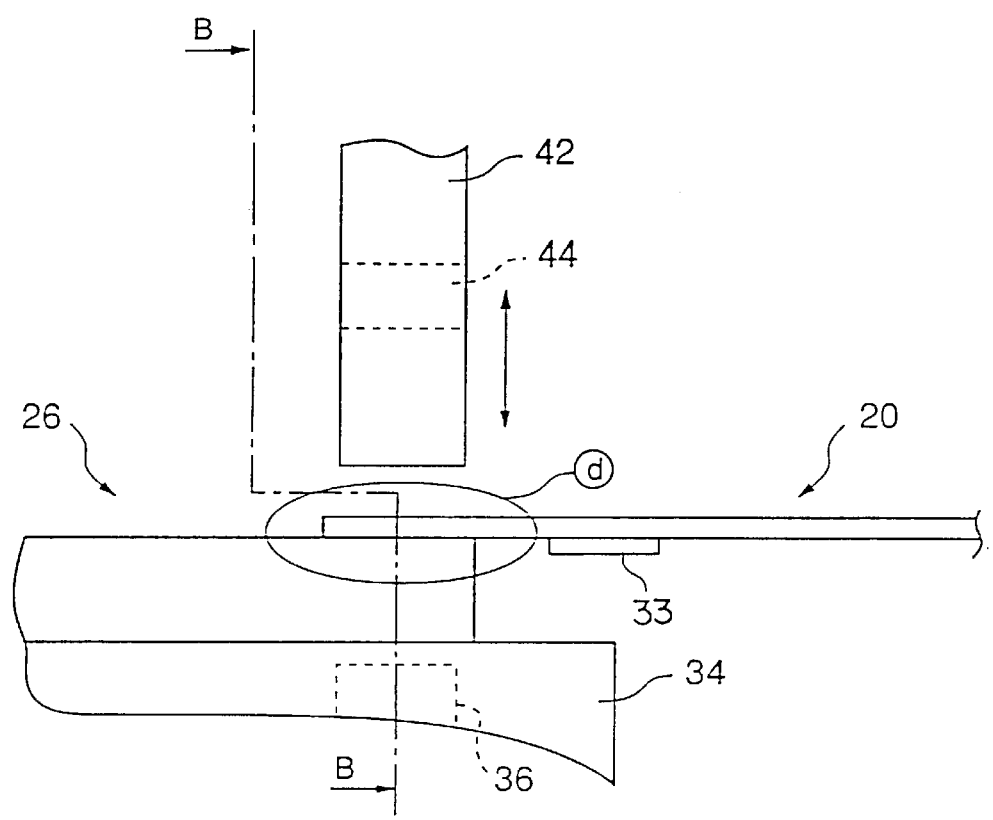
FIG. 2 is an explanatory view showing the process for connecting the connecting subject with the narrow-pitch connector.
Figure 3:
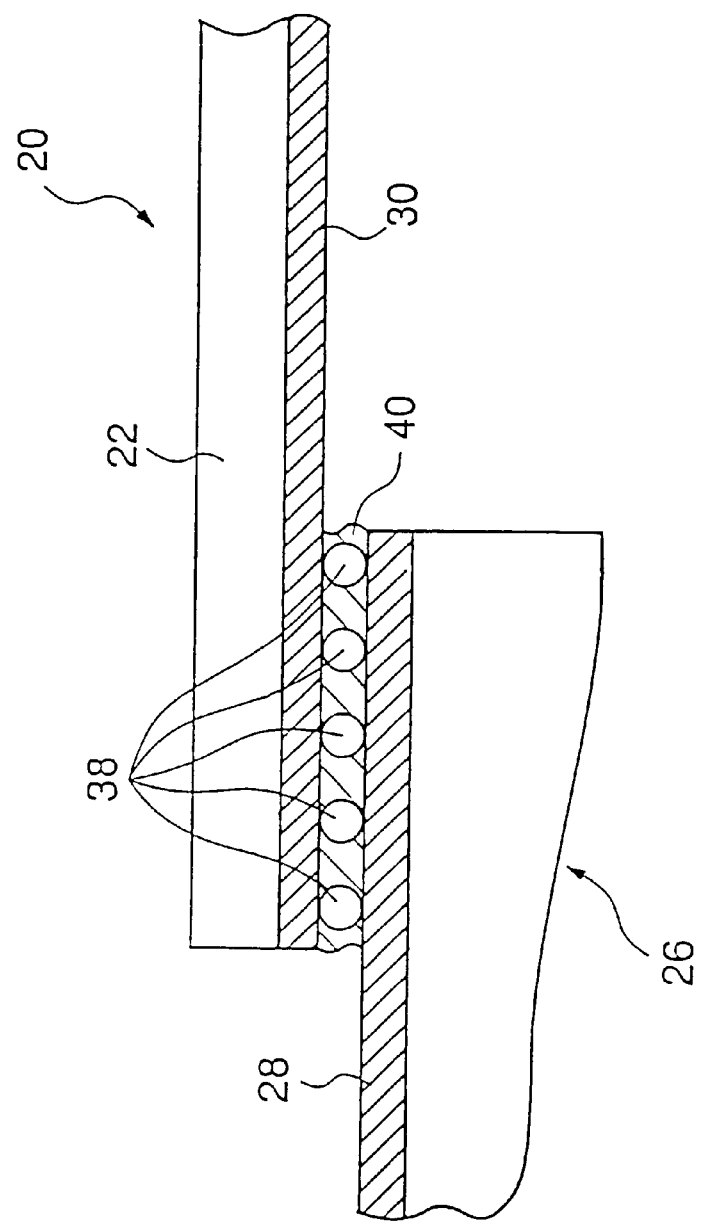
FIG. 3 is an enlarged view of a portion d in FIG. 2.
Figure 4:
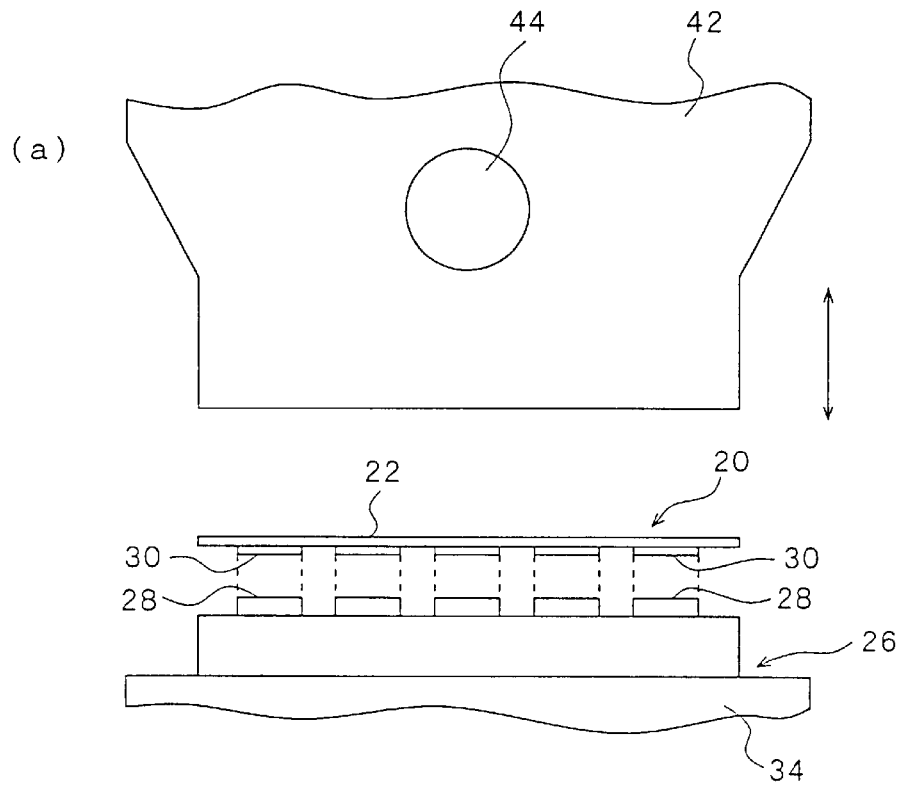
FIGS. 4(a) and 4(b) are sectional views, respectively, taken on line B—B in FIG. 2, showing the process for connecting the connecting subject with the narrow-pitch connector.
Figure 4:
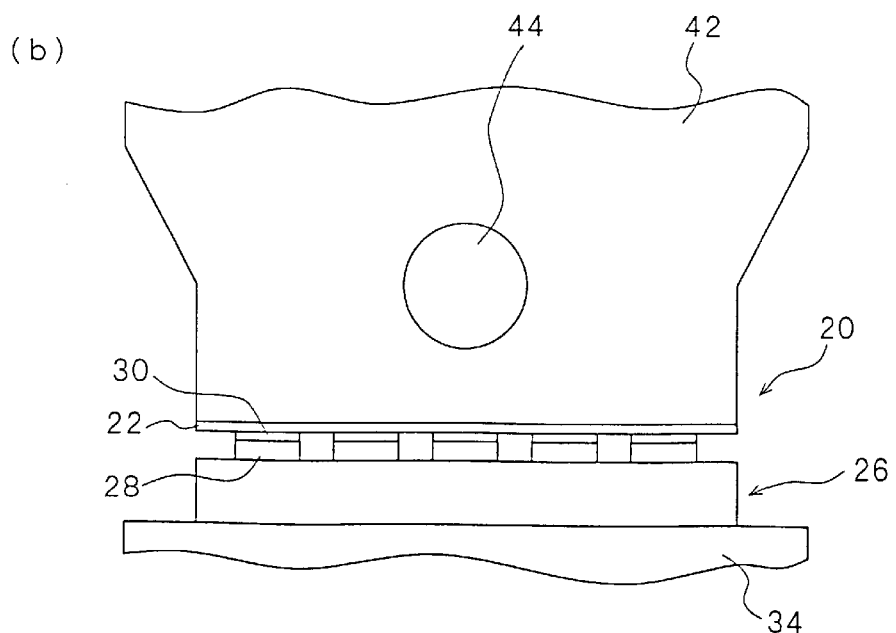

Next, description will be made about the process for connecting the narrow-pitch connector 20 having the aforementioned configuration with the connecting subject 26, with reference to FIGS. 2 to 4. FIG. 2 is an explanatory view of the process in which the terminal electrodes 28 of the connecting subject 26 and the terminal electrodes 30 of the narrow-pitch connector 20 are put on top of each other through electrically conductive members, and connected with each other by pressing and heating. FIG. 3 is an enlarged view of a portion d in FIG. 2, and FIG. 4 is a sectional view taken on line B—B in FIG. 2.

As shown in these drawings, when the narrow-pitch connector 20 is connected to the connecting subject 26, the connecting subject 26 is first installed on the upper surface of a bonding stage 34. A lower heater 36 is provided inside the bonding stage 34. By operating the lower heater 36, the connecting subject 26 and so on can be heated.

Above the connecting subject 26 disposed on the upper surface of the bonding stage 34, the connector 20 is disposed so that the terminal electrodes 30 on the connector side are put on the terminal electrodes 28 of the connecting subject 26. Here, a bonding agent 40 containing electrically conductive particles 38 is applied between the terminal electrodes 28 and the terminal electrodes 30 as shown in FIG. 3. By pressing the connector 20 from the back surface of the connector 20, the electrically conductive particles 38 abut against the terminal electrodes 28 and the terminal electrodes 30 so that these terminal electrodes are made electrically conductive with each other through the electrically conductive particles 38. In addition, the bonding agent 40 containing the electrically conductive particles 38 is accelerated to be solidified by the operation of the lower heater 36 or a heater included in a bonding tool which will be described below.

A bonding tool 42 is disposed above the terminal electrodes 30, that is, above the narrow-pitch connector 20. This bonding tool 42 is attached to a not-shown linear guide so as to be moved up and down along the linear guide. By moving the bonding tool 42 down, the narrow-pitch connector 20 is pressed from its back surface so that the terminal electrodes 28 and the terminal electrodes 30 which are put on top of each other are brought into tight contact through the electrically conductive particles 38. In addition, the bonding tool 42 includes an upper heater 44. By operating the upper heater 44, the front end of the bonding tool 42 is heated so that the narrow-pitch connector 20 can be heated.

Incidentally, in the upper and lower heaters 44 and 36, the temperatures is set so that the temperature around the boundary line between the terminal electrodes 28 and the terminal electrodes 30 is made uniform, that is, no temperature difference arises between the substrate 22 and the connecting subject 26, when the bonding tool 42 is moved down so that the front end of the bonding tool 42 presses the substrate 22 from its back surface. Then, not to say, the temperatures of the upper and lower heaters 44 and 36 are set to be not lower than temperature enough to accelerate the solidification of the bonding agent 40.

After the temperatures of the upper and lower heaters 44 and 36 are set thus, the bonding tool 42 is moved down so that the terminal electrodes 28 and the terminal electrodes 30 are connected with each other respectively from the state shown in FIG. 4(a) to the state shown in FIG. 4(b).

Incidentally, an anisotropic conductive bonding agent containing the electrically conductive particles 38, or an anisotropic conductive film in which the anisotropic conductive bonding agent is formed into a thin film, is used here for the connection between the terminal electrodes 28 and the terminal electrodes 30 so that the terminal electrodes 28 and 30 are brought into tight contact through the electrically conductive particles 38 contained in the bonding agent. However, the electrically conductive particles 38 are not always necessary. In the case where the electrically conductive particles 38 are not interposed, there is taken such a mode that the terminal electrodes 28 and the terminal electrodes 30 to be connected with each other are metal-bonded by use of welding or contact bonding.

Here, the substrate 22 and the connecting subject 26 are composed of one and the same material (silicon). In addition, the heating temperatures of the substrate 22 and the connecting subject 26 are equal to each other so that no temperature difference arises therebetween. Accordingly, when the terminal electrodes 28 and the terminal electrodes 30 are connected with each other, the degrees of elongation of the terminal electrodes 28 and 30 caused by heating become equal to each other so that no relative positional deviation between the terminal electrodes 28 and the terminal electrodes 30 arises. As a result, both the terminal electrodes can be bonded with each other surely, so that the disadvantages such as increase in resistance value, a failure in bonding, or short-circuit between adjacent terminals can be prevented from occurring at the time of connection of the electrodes. Incidentally, this embodiment was described about the case where silicon was used as the material composing the substrate 22 and the connecting subject 26 by way of example. In this case, according to various investigations by the present inventor, it was confirmed that connection could be made surely even if the wiring pitch was not larger than 25 μm, for example, even if the wiring pitch was about 15 μm. From this fact, it is inferred that connection can be made in accordance with the range of connection resolution even if the wiring pitch is not larger than 15 μm.

Incidentally, the material of the substrate 22 is not always made the same as that of the connecting subject 26. Even if the materials of the both are different and there is a difference in thermal expansion coefficient therebetween due to the different materials, a temperature difference is set at the time of heating so that the substrate 22 and the connecting subject 26 can be bonded with each other surely. That is, the output values of the upper and lower heaters 44 and 36 are changed so that a temperature difference is produced aggressively between the substrate 22 and the connecting subject 26. Specifically, the temperature of the heater disposed on the side where the thermal expansion coefficient is smaller is set to be higher while the temperature of the heater disposed on the side where the thermal expansion coefficient is larger is set to be lower. By producing a temperature difference aggressively thus, the degree of elongation caused by the difference in thermal expansion coefficient is absorbed so that the relative positions of both the terminal electrodes are made equal to each other. Thus, both the terminal electrodes can be bonded with each other so that disadvantages such as increase in resistance value, a failure in bonding, or short-circuit between adjacent terminals can be prevented from arising at the time of connection of the electrodes.

Figure 5:
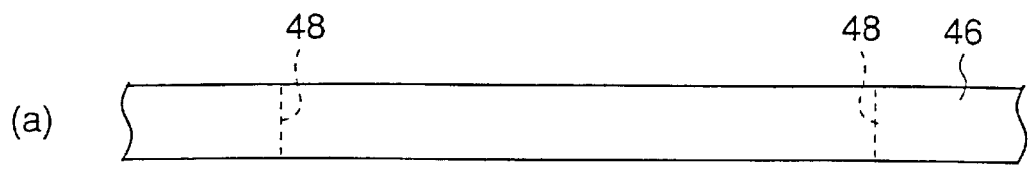
FIGS. 5(a) to 5(c) are explanatory process views, respectively, showing the process for manufacturing the narrow-pitch connector according to Embodiment 1.
Figure 5:
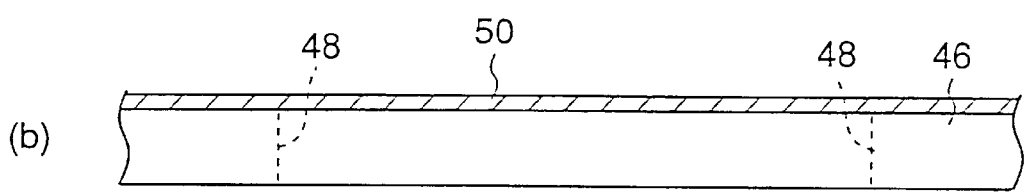
Figure 5:
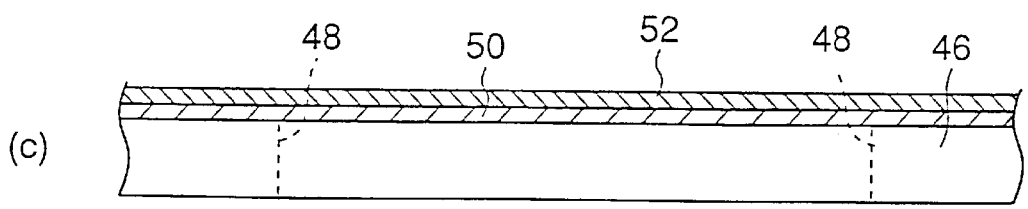
Figure 6:
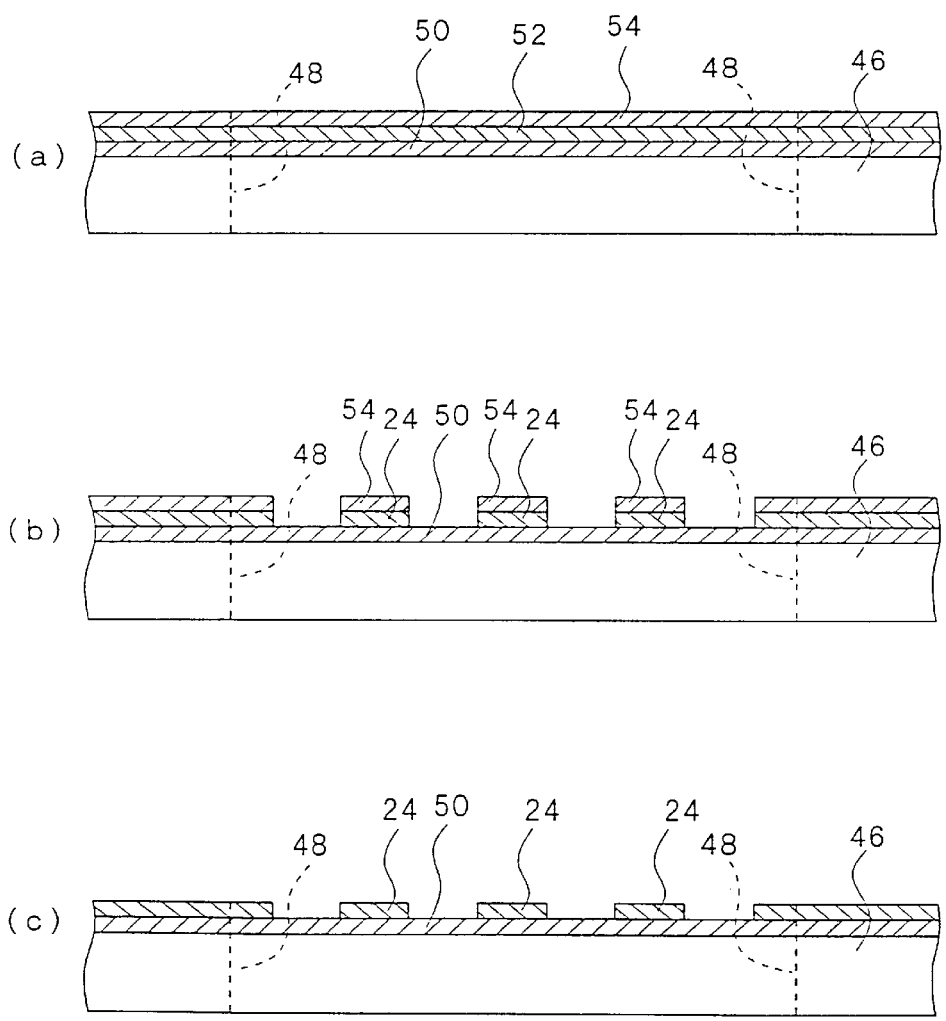
FIGS. 6(a) to 6(c) are explanatory process views, respectively, showing the process for manufacturing the narrow-pitch connector according to Embodiment 1.

Next, description will be made about the method for manufacturing the narrow-pitch connector according to this embodiment. FIGS. 5 and 6 are process explaining views respectively showing the process for manufacturing the narrow-pitch connector according to this embodiment. Incidentally, in these drawings, the process in which metal wirings are formed on a substrate is shown in the sectional direction taken on line A—A in FIG. 1, and the broken lines in the respective drawings designate a dicing line 48 for separating narrow-pitch connectors formed adjacently from each other.

First, as shown in FIG. 5(b), an insulating film 50 which is 5,000 to 20,000 angstroms thick is formed on the surface of a semiconductor wafer 46, composed of single crystal silicon shown in FIG. 5(a). For example, this insulating film 50 may be formed by use of BPSG (Boron-Phospho-Solicate Glass) deposited by a CVD method, dry thermal oxidation, wet thermal oxidation, or the like.

After the insulating film 50 is formed on the surface of the semiconductor wafer 46 in such a manner, the semiconductor wafer 46 provided with the insulating film 50 is disposed in an argon atmosphere with a pressure of 2 to 5 mTorr and a temperature of 150 to 300° C. Then, sputtering is performed by input power of DC 9 to 12 kw so as to target Al—Cu, Al—Si—Cu, Al—Si, Ni, Cr, Au, etc. Thus, a metal film 52 for forming metal wirings each having the same composition as such targets is deposited to be 200 to 20,000 angstroms thick. Incidentally, the metal film 52 may be formed not in the aforementioned manner but in such a manner that Au may be deposited to be about 1,000 angstroms thick on a primary coat of Cr. This state is shown in FIG. 5(c).

After the metal film 52 is formed on the upper surface of the insulating film 50, a photo-resist film 54 is applied onto the metal film 52 as shown in FIG. 6(a). Then, patterning is performed by photolithography as shown in FIG. 6(b), so that the photo-resist film 54 is removed except the portion where the metal wirings will be formed, and the metal film 52 is etched with the photo-resist film 54 as a mask. Then, as shown in FIGS. 6(b) and (c), the photo-resist film 54 on the metal wirings 24 formed by etching the metal film 52 is removed. Next, the work of cutting is performed along the dicing lines 48, so that narrow-pitch connectors are cut from the semiconductor wafer 46.

Embodiment 2

Figure 7:
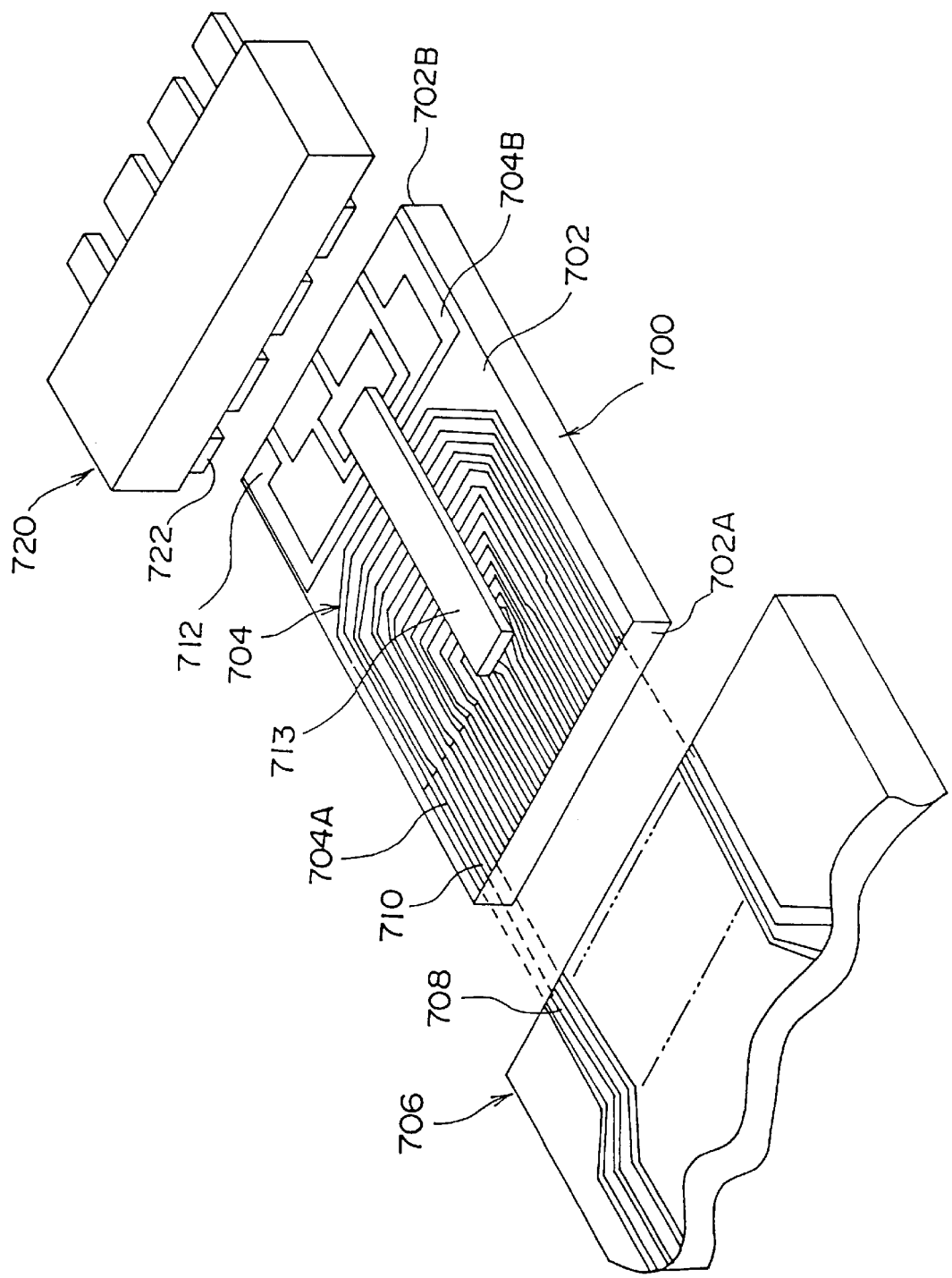
FIG. 7 is an enlarged view showing a main portion of a narrow-pitch connector according to Embodiment 2 of the present invention, and respective terminal portions of a connecting subject and a flexible substrate to which this connector is connected.

FIG. 7 shows another example of the narrow-pitch connector according to this embodiment. FIG. 7 is an enlarged view showing a main portion of the relationship among this connector, a terminal portion of a connecting subject to be connected with one side of the connector, and a terminal portion of an external substrate such as a flexible substrate or the like to be connected to the other side of the connector. As shown in FIG. 7, a narrow-pitch connector 700 according to this embodiment has a configuration where metal wirings 704 are formed on the surface of a connector body 702.

The substrate 702 is composed of rectangular single crystal silicon, and manufactured by cutting a semiconductor wafer, in which a semiconductor device is formed on the surface, into a lattice. A plurality of metal wirings 704A and a plurality of metal wirings 704B are provided on the surface of the substrate 702 so as to cross the substrate 702. Terminal electrodes 710 as bonding portions which can be put on terminal electrodes 708 provided on a connecting subject 706 are formed in one end portions of the metal wirings 704, that is, in an end portion 702A of the substrate 702. That is, the terminal electrodes 710 are set to have the same pitch as the pitch (not larger than 60 µm) of the terminal electrodes 708. On the other hand, in an end portion 702B of the substrate 702 opposite to the terminal electrodes 710, terminal electrodes 712 as bonding portions which can be put on terminal electrodes 722 provided on a flexible substrate 720 are formed so that the number of the terminal electrodes 712 is smaller than the number of the terminal electrodes 710 but the width and pitch of the terminal electrodes 712 are enlarged (the pitch of not smaller than 80 µm). In addition, a semiconductor device 713 for driving elements of the connecting subject 706 is mounted on a central portion of the substrate 702 so that the semiconductor device 713 is disposed to be long from side to side, that is, the short sides of the semiconductor device 713 are set substantially in parallel with the terminal alignment direction of the connecting subject 706. Incidentally, the end portions of the metal wirings 704A opposite to the terminal electrodes 710 and the end portions of the metal wirings 704B opposite to the terminal electrodes 712 are located in the electrode positions of the semiconductor device 713. Thus, when both the end portions of the metal wirings 704A and 704B are connected with the electrodes of the semiconductor device 713 so that electrical connection is made among the terminals of the semiconductor device 33, the metal wirings 704A and the metal wirings 704B.

Thus, the semiconductor device 713 is disposed in tight contact with the surface of the substrate 702. Accordingly, when heat is generated in the semiconductor device 713, this generated heat is transferred to the substrate 702, and the substrate 702 plays the role of a radiator plate (heat sink). As a result, even if the heating value of the semiconductor device 713 increases, the substrate 702 efficiently radiates the heat generated in the semiconductor device 713, so that it is possible to drive the semiconductor device 713 stably.

Further, the semiconductor device 713 is held by the substrate 702, and the electrodes provided in the semiconductor device 713 are connected with the metal wirings 704A and 704B formed tightly on the surface of the substrate 702. Thus, even if external force is applied to the semiconductor device 713, it is possible to restrain a failure in connection in comparison with the background-art method using a tape carrier package.

In addition, because the semiconductor device 713 is mounted inside the substrate 702, it becomes unnecessary to mount the semiconductor device 713 in front of or at rear of the narrow-pitch connector 700, that is, on the connecting subject 706 or on an external substrate such as a flexible substrate 720 or the like connected to the terminal electrodes 712. As a result, it is possible to reduce the mounting area, so that it is possible to miniaturize the apparatus itself.

In addition, because the semiconductor device 713 is disposed so that the short sides of the semiconductor device 713 are substantially in parallel with the terminal alignment direction of the connecting subject 706, the width of the narrow-pitch connector can be reduced. Incidentally, the semiconductor device 713 may be disposed so that the long sides of the semiconductor device 713 become substantially in parallel with the terminal alignment direction of the connecting subject 706. In this case, the lengths of the respective wirings to the semiconductor device 713 become equal to one another so that the resistant value of the wiring pattern can be made uniform.

In addition, the number of the connecting subjects 706 which can be produced from one semiconductor wafer can be increased, so that the manufacturing efficiency can be improved and the manufacturing cost can be reduced.

Incidentally, in the connecting subject 706 where the terminal electrodes 708 are formed, for example, a piezoelectric element is provided on a silicon substrate composed of the same material as that of the substrate 702. Thus, the connecting subject 706 is provided as a printer head (hereinafter referred to as "printer engine portion") for blasting ink by vibration of the piezoelectric element. By applying voltage to the terminal electrodes 708, the piezoelectric element provided on the connecting subject 706 can be operated (vibrated).

Incidentally, in the case where an anisotropic conductive bonding agent containing electrically conductive members, that is, electrically conductive particles, or an anisotropic conductive film in which the anisotropic conductive bonding agent is formed into a thin film, is put between terminal electrodes of the micro-pump and terminal electrodes of the narrow-pitch connector when both the terminal electrodes are bonded with each other, these terminal electrodes to be connected with each other are brought into tight contact through the anisotropic conductive bonding agent or the anisotropic conductive film. On the contrary, in the case where such an anisotropic conductive bonding agent or such an anisotropic conductive film is not interposed, the terminal electrodes to be connected with each other are metal-bonded by use of welding or contact bonding.

Embodiment 3

Figure 8:
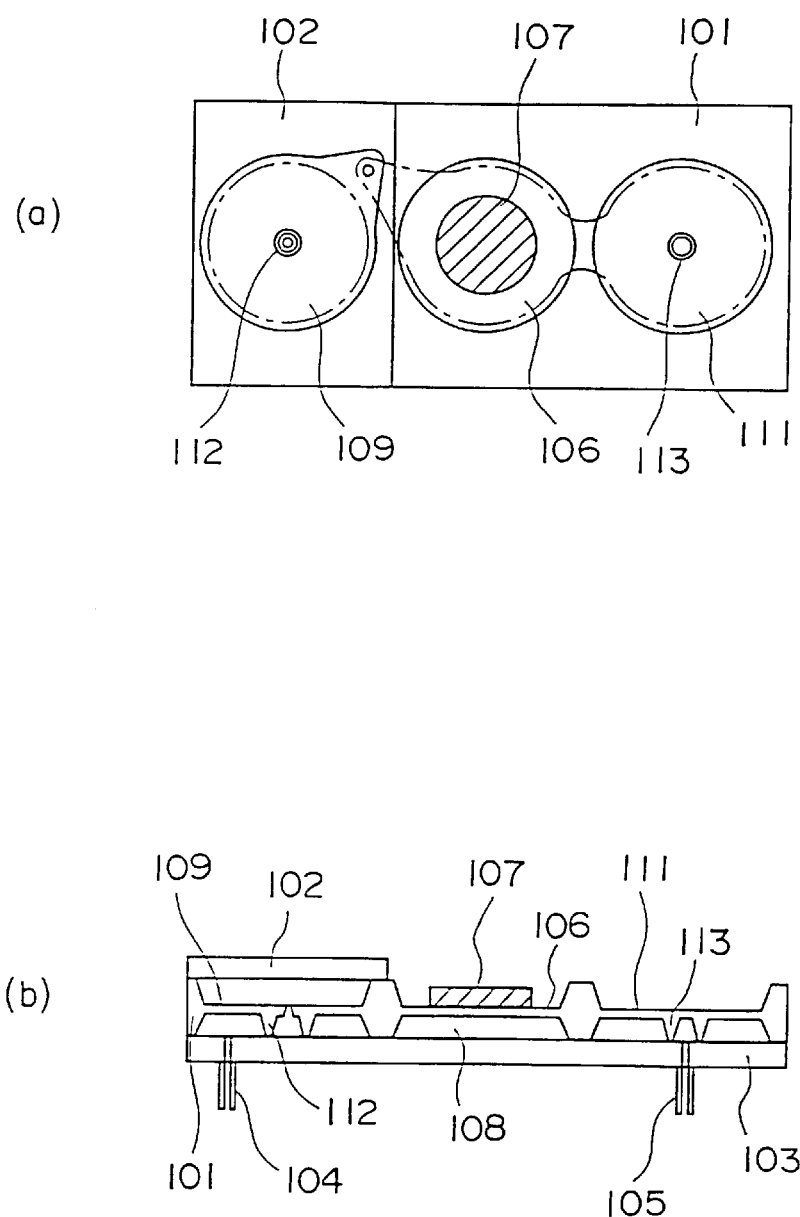
FIG. 8(a) and FIG. 8(b) are explanatory views showing a micro-pump as an example of a micro-machine according to Embodiment 3 of the present invention.

FIG. 8 relates to a micro-pump as an example of a micro-machine according to this embodiment. FIG. 8(a) is a top view of the micro-pump, and FIG. 8(b) is a sectional view thereof.

The micro-pump has a structure in which a silicon substrate 101 machined by a micro-machining method is sandwiched between two glass plates 102 and 103 so that fluid is sucked from a suction-side pipe 104 and discharged to a discharge-side pipe 105.

The principle of the operation of the micro-pump is as follows. A voltage is applied to a piezoelectric element 107 pasted onto a diaphragm 106 formed in the central portion of the silicon substrate 101 so that the piezoelectric element 107 is bent. As a result, the pressure in a pressure chamber 108 is changed so that a suction-side valve membrane 109 and a discharge-side valve membrane 111 which spatially continue the pressure chamber 108 are displaced. As a result, a suction valve 112 and a discharge valve 113 are opened and closed. Thus, the fluid is compressed and delivered from the suction-side pipe 104 to the discharge-side pipe 105. Incidentally, in FIG. 8(b), the pressure chamber 108 continues a space above the suction-side valve membrane 109 and a space under the discharge-side valve membrane 111.

Also in this example, wiring to the outside is performed while temperature control at the time of pressing and heating is performed through a narrow-pitch connector similar to that shown in FIGS. 1 to 3, which is mounted with a semiconductor device for driving the micro-pump, so that terminals are prevented from relative positional deviation from each other when the terminals are bonded with each other. Thus, by providing the narrow-pitch connector separately, the micro-pump itself can be manufactured with a small size.

In addition, the semiconductor device mounted on the narrow-pitch connector for driving the micro-pump is in close contact with the surface of the substrate through an insulating layer. Accordingly, even if heat is generated in the semiconductor device, the heat generated in the semiconductor device is transferred to the substrate, and then radiated from the substrate. Thus, not only the surface of the semiconductor device but also the surface of the substrate serve for heat radiation. Accordingly, even if the heating value of the semiconductor device is large, heat radiation can be performed satisfactorily.

Incidentally, in the case where an anisotropic conductive bonding agent containing electrically conductive members, that is, electrically conductive particles, or an anisotropic conductive film in which the anisotropic conductive bonding agent is formed into a thin film, is put between terminal electrodes of the micro-pump and terminal electrodes of the narrow-pitch connector when both the terminal electrodes are bonded with each other, these terminal electrodes to be connected with each other are brought into tight contact through the anisotropic conductive bonding agent or the anisotropic conductive film. On the contrary, in the case where such an anisotropic conductive bonding agent or such an anisotropic conductive film is not interposed, the terminal electrodes to be connected with each other are metal-bonded by use of welding or contact bonding.

Embodiment 4

Figure 9:
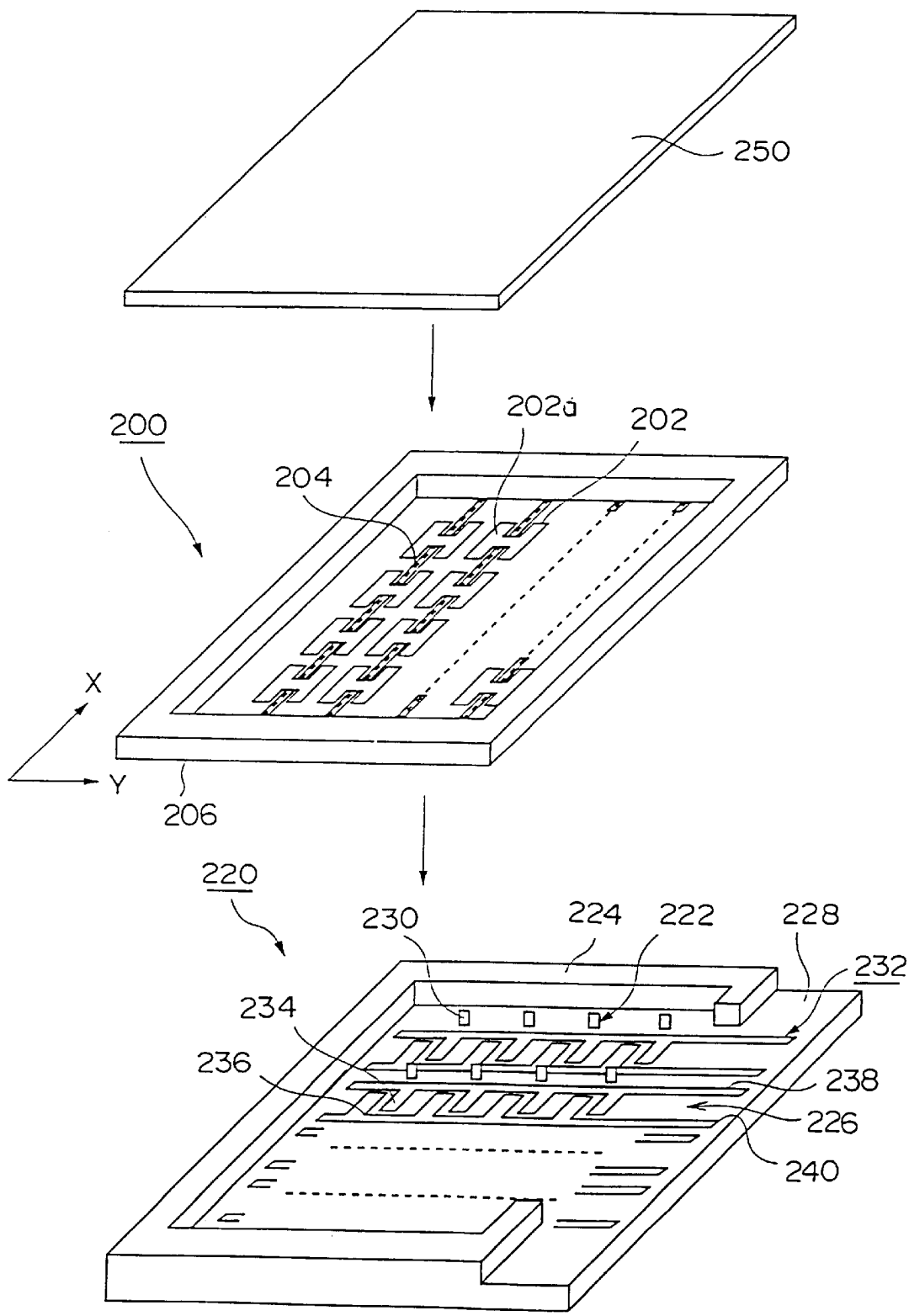
FIG. 9 is an exploded perspective view of a main portion showing a light modulator as another example according to Embodiment 4 of the present invention.

FIG. 9 is a main portion exploded perspective view showing a light modulator as another example according to this embodiment.

This light modulator is roughly constituted by a silicon substrate 200, a glass substrate 220 and a cover substrate 250.

The silicon substrate 200 has a plurality of micro-mirrors 202 arranged in the form of a matrix. Of these micro-mirrors 102, micro-mirrors 202 arranged in one direction, for example, in a direction X in FIG. 9, are connected with one another by torsion bars 204. Further, a frame-like portion 206 is provided to enclose the area where the plurality of micro-mirrors 202 are arranged. Opposite ends of the plurality of torsion bars 204 are connected to this frame-like portion 206. In addition, slits are formed in the circumferences of the micro-mirrors 202 where the micro-mirrors 202 are connected with the torsion bars 204. By forming these slits, the torsion bars 204 are easily driven so as to incline around the axes thereof. Further, a reflective layer 202a is formed on the surface of each micro-mirror 202. Then, when each micro-mirror 202 is driven to incline, the reflecting direction of light incident to this micro-mirror 202 varies. By controlling the time to reflect the light in a predetermined reflecting direction, light modulation can be attained. A circuit for driving the micro-mirrors 202 so as to incline is formed on the glass substrate 220.

The glass electrode substrate 220 has a recess portion 222 in the central area thereof, and has a rising portion 224 around the recess portion 222. One side of the rising portion 224 is cut out to form an electrode take-out port 226. An electrode take-out plate portion 228 continued the recess portion 222 is formed outside the electrode take-out port 226. In addition, in the recess portion 222 of the glass substrate 220, a large number of columnar support portions 230 are formed to project from the recess portion 222 and to have the same height as that up to the ceiling surface of the rising portion 224, each in the position facing the torsion bar 204 between every two of the micro-mirrors 202 adjacent to each other in the direction X. Further, wiring pattern portions 232 are formed on the recess portion 222 and the electrode take-out plate portion 228 of the glass substrate 220. Each of these wiring pattern portions 232 has first and second address electrodes 234 and 236 in positions opposite to the back surfaces of the micro-mirrors 202 on the opposite sides of the torsion bar 204. Then, the first address electrodes 234 arranged in a direction Y are connected with a first common wiring 238 in common. Similarly, the second address electrodes 236 arranged in the direction Y are connected with a second common wiring 240 in common.

The silicon substrate 200 is anode-bonded onto the glass substrate 220 having the aforementioned structure. At this time, the opposite end portions of the torsion bars 204 and the frame-like portion 206 of the silicon substrate 200 are bonded with the rising portion 224 of the glass substrate 220. Further, the intermediate portions of the torsion bars 204 of the silicon substrate 200 are anode-bonded with the columnar support portions 230 of the glass substrate 220 respectively. Then, the cover substrate 250 is bonded onto the frame-like portion 206 of the silicon substrate 200. The opposite end portions of each torsion bar 104 connected with the frame-like portion 206 are diced in positions where they should be cut from the frame-like portion 206. Further, a circumferential edge portion including the electrode take-out port 226 formed in the rising portion 224 of the glass substrate 220 by cutting is sealed or closed by a sealing material. Thus, a light modulator is completed. Then, a narrow-pitch connector similar to that shown in FIGS. 1 to 3, which is mounted with a semiconductor device for driving the micro-mirrors to incline, is connected to the first common wiring 238 and the second common wiring 240 of the completed light modulator. Thus, the light modulator is connected with a flexible substrate such as a flexible board, or the like, through the narrow-pitch connector so that signals are supplied to the light modulator.

Also in this example, the common wirings 238 and 240 are connected with the narrow-pitch connector while the temperature control is performed so that terminals are prevented from relative positional deviation from each other when the terminals are bonded with each other. Thus, by providing the narrow-pitch connector separately, the area occupied by the wiring terminals of the glass substrate 220 can be minimized, so that the light modulator itself can be manufactured with a small size.

In addition, the semiconductor device mounted on the narrow-pitch connector for driving the micro-mirrors to incline is in close contact with the surface of the substrate through an insulating layer. Accordingly, even if heat is generated in the semiconductor device, the heat generated in the semiconductor device is transferred to the substrate, and then radiated from the substrate. Thus, not only the surface of the semiconductor device but also the surface of the substrate serve for heat radiation. Accordingly, even if the heating value of the semiconductor device is large, heat radiation can be performed satisfactorily.

Incidentally, in the case where an anisotropic conductive bonding agent containing electrically conductive members, that is, electrically conductive particles, or an anisotropic conductive film in which the anisotropic conductive bonding agent is formed into a thin film, is put between the common wirings 238 and 240 as terminal electrodes of the light modulator and the terminal electrodes of the narrow-pitch connector when both the terminal electrodes are bonded with each other, these terminal electrodes to be connected with each other are brought into tight contact through the anisotropic conductive bonding agent or the anisotropic conductive film. On the contrary, in the case where such an anisotropic conductive bonding agent or such an anisotropic conductive film is not interposed, the terminal electrodes to be connected with each other are metal-bonded with each other by use of welding or contact bonding.

Embodiment 5

Figure 10:
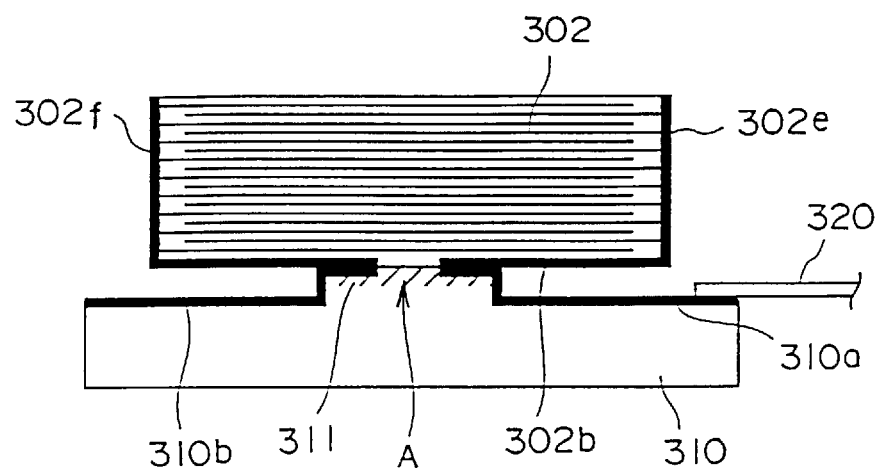
FIG. 10 is an explanatory view showing a piezoelectric actuator according to Embodiment 5 of the present invention.

FIG. 10 is an explanatory view showing a piezoelectric actuator according to this embodiment.

The piezoelectric actuator has a piezoelectric vibrator 302 in which external electrodes 302e and 202f (portions designated by the thick lines in FIG. 10) are formed on opposite sides, and a holding member 310 for holding this piezoelectric vibrator 302. In the holding member 310, a protrusion portion 311 is formed. The piezoelectric vibrator 302 is bonded with the holding member 310 in a bonding area A of the protrusion portion 311. The external electrodes 302e and 302f of the piezoelectric vibrator 302 are extended from opposite side surfaces of the piezoelectric vibrator 302 to the middle of a first surface 302b, respectively. In addition, electrodes 310a and 310b formed in the holding member 310 and designated by the thick lines are also extended from opposite outer edges to the middle of the protrusion portion 311. While the piezoelectric vibrator 302 and the holding member 310 are rigidly bonded with each other in the bonding area A set in the protrusion portion 311, the external electrodes 302e and 302f of the piezoelectric vibrator are connected with the electrodes 310a and 310b of the holding member so that these electrodes are made electrically conductive with each other. Further, a narrow-pitch connector 320 similar to that shown in FIGS. 1 to 3, which is mounted with a semiconductor device for driving the piezoelectric vibrator, is connected with the electrodes 310a and 310b of the holding member 310. Thus, the electrodes 310a and 310b of the holding member 310 are connected with a flexible substrate such as a flexible board, or the like, through the narrow-pitch connector 320 so that signals from the outside are supplied to the piezoelectric actuator.

Also in this example, the electrodes 310a and 310b of the holding member 310 are connected with the narrow-pitch connector 320 while the temperature control is performed so that the terminal electrodes are prevented from relative positional deviation from each other when the terminal electrodes are bonded with each other. Thus, by providing the narrow-pitch connector separately, the area occupied by the wiring terminals of the piezoelectric actuator can be minimized, so that the piezoelectric actuator itself can be manufactured with a small size. At the same time, a large number of piezoelectric actuators can be manufactured from one sheet of wafer, so that the manufacturing cost can be reduced.

In addition, the semiconductor device mounted on the narrow-pitch connector for driving the piezoelectric vibrator is in close contact with the surface of the substrate through an insulating layer. Accordingly, even if heat is generated in the semiconductor device, the heat generated in the semiconductor device is transferred to the substrate, and then radiated from the substrate. Thus, not only the surface of the semiconductor device but also the surface of the substrate serve for heat radiation. Accordingly, even if the heating value of the semiconductor device is large, heat radiation can be performed satisfactorily.

Incidentally, in the case where an anisotropic conductive bonding agent containing electrically conductive members, that is, electrically conductive particles, or an anisotropic conductive film in which the anisotropic conductive bonding agent is formed into a thin film, is put between the terminal electrodes 310a and 310b of the piezoelectric actuator and the terminal electrodes of the narrow-pitch connector 320 when both the terminal electrodes are bonded with each other, these terminal electrodes to be connected with each other are brought into tight contact through the anisotropic conductive bonding agent or the anisotropic conductive film. On the contrary, in the case where such an anisotropic conductive bonding agent or such an anisotropic conductive film is not interposed, the terminal electrodes to be connected with each other are metal-bonded with each other by use of welding or contact bonding.

Embodiment 6

Figure 11:
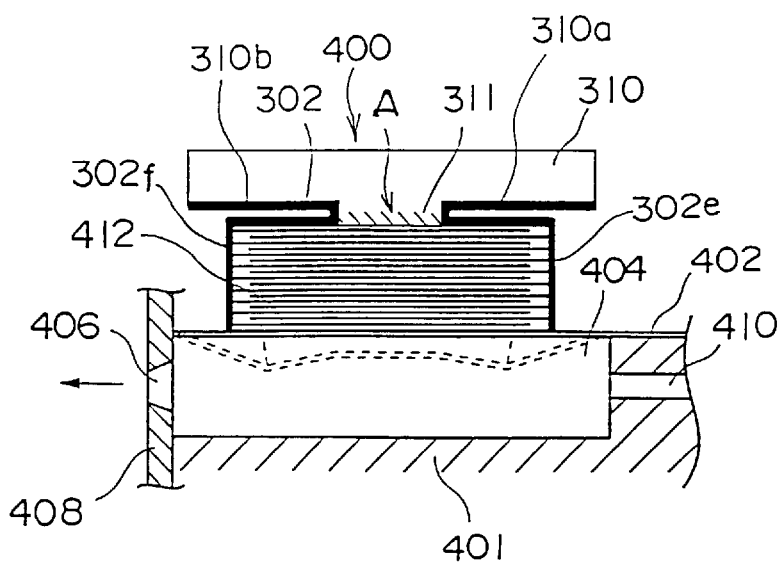
FIG. 11 is a conceptual view showing an ink jet head using the piezoelectric actuator according to Embodiment 6 of the present invention.

FIG. 11 is a conceptual view showing an ink jet head according to this embodiment, using the above-mentioned piezoelectric actuator in FIG. 10. Parts the same as those in FIG. 10 are referenced correspondingly.

In this ink jet head 400, a nozzle plate 408 provided with a nozzle 406 is bonded with a front end of an ink channel 404 formed by a channel formation member 401 and a diaphragm 402. An ink supply channel 410 is disposed at the opposite end to the nozzle plate 408. The piezoelectric actuator is installed so that a mechanical action surface 412 abuts against the diaphragm 402, and the piezoelectric actuator is disposed to face the ink channel 410. Then, the external electrodes 302e and 302f on the opposite sides of the piezoelectric vibrator 302 are connected with the electrodes 310a and 310b of the holding member 310. Thus, the electrodes 310a and 310b of the holding member 310 are connected with a flexible substrate such as a flexible board, or the like, through a narrow-pitch connector 320 (see FIG. 10) similar to that shown in FIGS. 1 to 3, which is mounted with a semiconductor device for driving the piezoelectric vibrator, so that signals from the outside are supplied to the piezoelectric actuator.

In this configuration, when ink is charged into the ink channel 410 (up to the front end of the nozzle 406) and the aforementioned piezoelectric actuator is driven, the mechanical action surface 412 produces high efficient expanding deformation and bending deformation simultaneously so as to obtain a very large effective displacement in the up/down direction in FIG. 11. Due to this deformation, the diaphragm 402 is deformed correspondingly to the mechanical action surface 412 as shown by the dotted line in FIG. 11, to generate a large change in pressure (change in volume) in the ink channel 410. Due to this change in pressure, an ink droplet is discharged from the nozzle 406 in the arrow direction in FIG. 11. The ink is discharged very efficiently because of the high efficient pressure change.

Thus, by providing the narrow-pitch connector separately, the area occupied by the wiring terminals of the piezoelectric actuator can be minimized, so that the ink jet head itself can be manufactured with a small size.

In addition, the semiconductor device mounted on the narrow-pitch connector for driving the piezoelectric vibrator is in close contact with the surface of the substrate through an insulating layer. Accordingly, even if heat is generated in the semiconductor device, the heat generated in the semiconductor device is transferred to the substrate, and then radiated from the substrate. Thus, not only the surface of the semiconductor device but also the surface of the substrate serve for heat radiation. Accordingly, even if the heating value of the semiconductor device is large, heat radiation can be performed satisfactorily.

Incidentally, as described above, in the case where an anisotropic conductive bonding agent containing electrically conductive members, that is, electrically conductive particles, or an anisotropic conductive film in which the anisotropic conductive bonding agent is formed into a thin film, is put between the terminal electrodes 310a and 310b of the piezoelectric actuator and the terminal electrodes of the narrow-pitch connector 320 when both the terminal electrodes are bonded with each other, these terminal electrodes to be connected with each other are brought into tight contact through the anisotropic conductive bonding agent or the anisotropic conductive film. On the contrary, in the case where such an anisotropic conductive bonding agent or such an anisotropic conductive film is not interposed, the terminal electrodes to be connected with each other are metal-bonded by use of welding or contact bonding.

Embodiment 7

Figure 12:
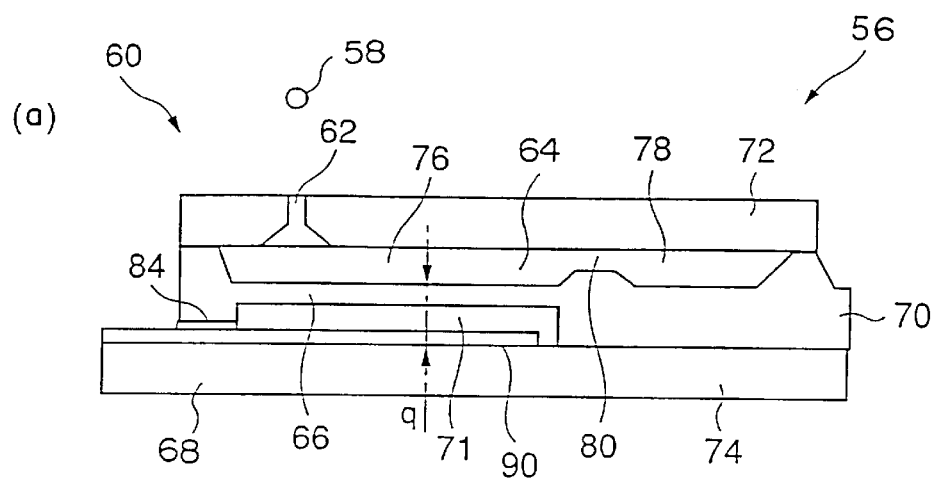
FIG. 12(a) and FIG. 12(b) are explanatory views showing the structure of an ink jet head using an electrostatic actuator according to Embodiment 7 of the present invention.
Figure 12:
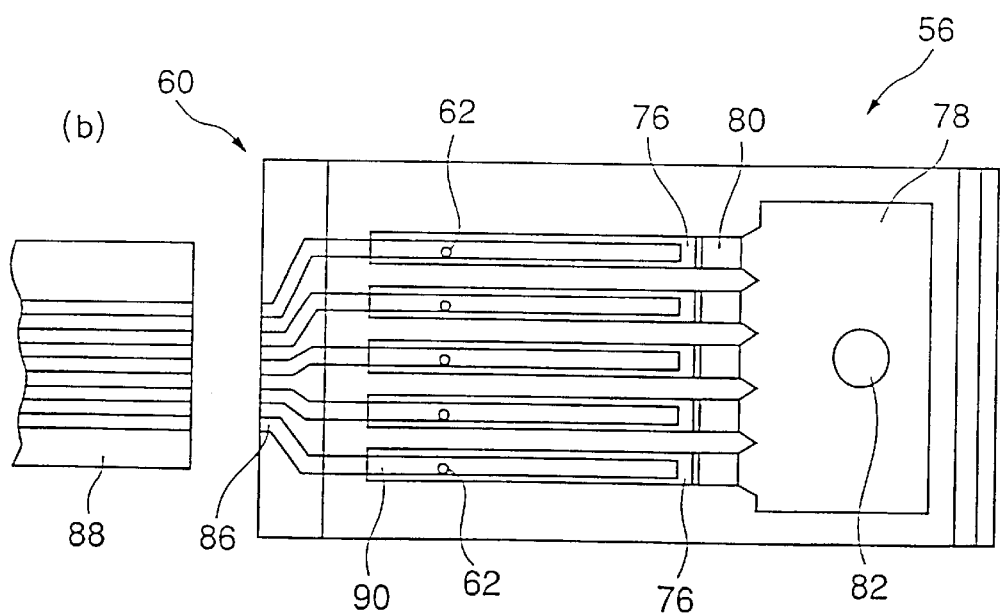

FIGS. 12(*a*) and (*b*) are explanatory views showing the structure of an electrostatic actuator manufactured by use of a micro-machining technology.

An electrostatic actuator 56 is a micro-structure actuator which is used in an ink jet head in an ink jet printer, and which is formed by use of a fine machining technique based on micro-machining technology.

Such a micro-structure actuator uses electrostatic force as a driving source. In an ink jet head 60 for discharging ink droplets 58 by use of such electrostatic force, the bottoms of ink channels 64 communicating with nozzles 62 are formed as diaphragms 66 which will be elastically deformable vibrators respectively. A substrate 68 is disposed in opposition to the diaphragms 66 at a fixed interval (see a size q in FIG. 12(*a*)). Opposed electrodes 90 are disposed over the diaphragms 66 and the surface of the substrate 68, respectively.

When a voltage is applied between the opposed electrodes, the diaphragms 66 are electrostatically attracted toward the substrate 68 due to electrostatic force generated between the opposed electrodes. Thus, the diaphragms 66 vibrate. Due to this vibration of the diaphragms 66, the ink droplets 58 are discharged from the nozzles 62 by the internal pressure change generated in the ink channels 64.

Incidentally, the ink jet head 60 has a three-layer structure in which a silicon substrate 70, a nozzle plate 72 composed of silicon and a glass substrate 74 composed of borosilicate glass are laminated so that the silicon substrate 70 is held between the nozzle plate 72 on the upper side and the glass substrate 74 on the lower side.

Here, in the silicon substrate 70 disposed in the middle, grooves functioning as five independent ink chambers 76, one common ink chamber 78 for connecting these five ink chambers 76 with one another, and ink supply channels 80 for making this common ink chamber 78 communicate with the respective ink chambers 76, are formed by etching the silicon substrate 70 from its surface.

These grooves are closed by the nozzle plate 72 so that the portions are defined. In addition, five independent vibration chambers 71 are formed by etching the silicon substrate 70 from its back side.

In the nozzle plate 72, the nozzles 62 are formed in positions corresponding to front end portions of the respective ink chambers 76 so as to communicate with the respective ink chambers 76.

Further, ink is supplied from a not-shown ink tank to the common ink chamber 78 through an ink supply port 82.

Incidentally, a sealing portion 84 seals fine gaps formed by the opposed electrodes 90 and the silicon substrate 70.

In addition, the respective opposed electrodes 90 of the glass substrate 74 are led out to the end portion side in the left of the drawings so as to form fine-pitch terminal electrodes 86 which are respectively connected to a narrow-pitch connector 88 using a second substrate as a base material according to this embodiment, which is mounted with a semiconductor device for driving the diaphragms. Incidentally, this connection is performed while temperature control is performed so that the terminal electrodes are prevented from relative positional deviation from each other when the terminal electrodes are bonded with each other.

According to the above description, the terminal electrodes with a narrow pitch can be connected. Thus, connection can be achieved even if the full width of the ink chamber is formed to be narrow.

In addition, the semiconductor device mounted on the narrow-pitch connector 88 for driving the diaphragms is in close contact with the surface of the substrate through an insulating layer. Accordingly, even if heat is generated in the semiconductor device, the heat generated in the semiconductor device is transferred to the substrate, and then radiated from the substrate. Thus, not only the surface of the semiconductor device but also the surface of the substrate serve for heat radiation. Accordingly, even if the heating value of the semiconductor device is large, heat radiation can be performed satisfactorily.

Incidentally, in the case where an anisotropic conductive bonding agent containing electrically conductive members, that is, electrically conductive particles, or an anisotropic conductive film in which the anisotropic conductive bonding agent is formed into a thin film, is put between the terminal electrodes 86 of the glass substrate 74 and the terminal electrodes of the narrow-pitch connector 88 when both the terminal electrodes are bonded with each other, these terminal electrodes to be connected with each other are brought into tight contact through the anisotropic conductive bonding agent or the anisotropic conductive film. On the contrary, in the case where such an anisotropic conductive bonding agent or such an anisotropic conductive film is not interposed, the terminal electrodes to be connected with each other are metal-bonded by use of welding or contact bonding.

Embodiment 8

Figure 13:
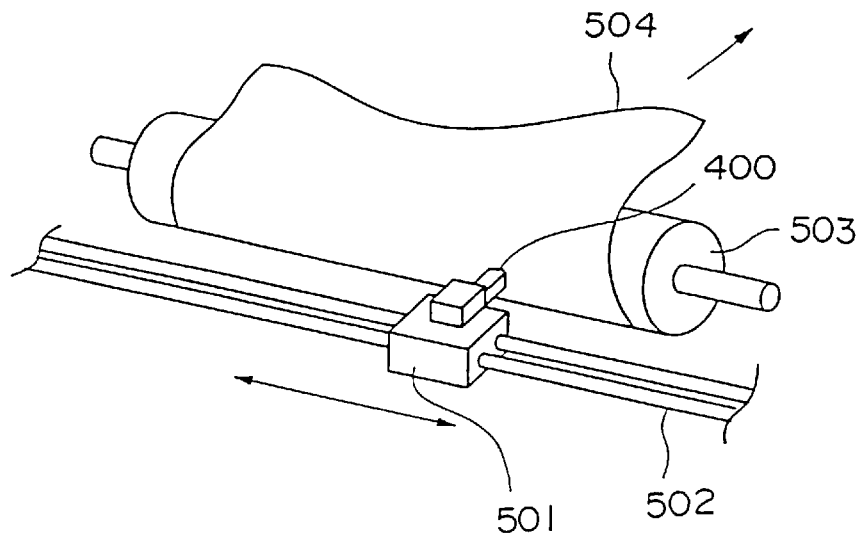
FIG. 13 is an explanatory view showing an example in which an ink jet head according to Embodiment 8 of the present invention is mounted.
Figure 14:
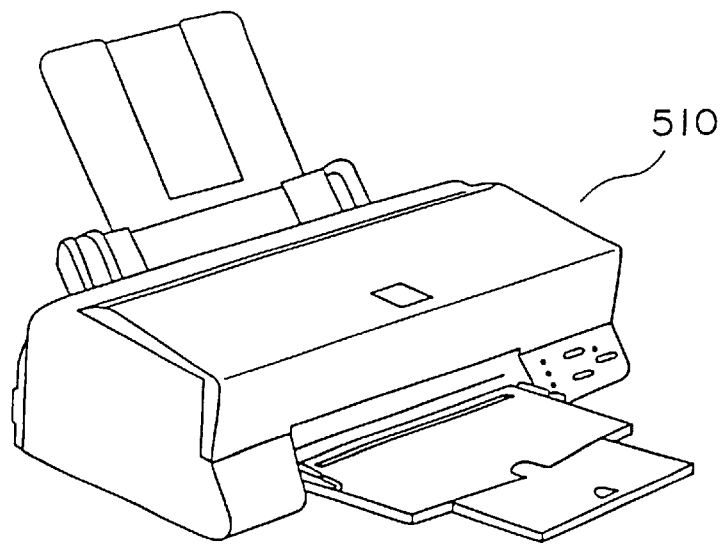
FIG. 14 is an explanatory view showing an ink jet printer according to Embodiment 8.

Incidentally, the aforementioned ink jet head 400 (see FIG. 11) using a piezoelectric actuator according to Embodiment 6 or the aforementioned ink jet head 60 (see FIG. 12) using an electrostatic actuator according to Embodiment 7 is attached to a carriage 501 as shown in FIG. 13 in use. Incidentally, here is shown an example of application of the ink jet head 400 using a piezoelectric actuator. The carriage 501 is movably attached to a guide rail 502, and the position of the carriage 501 is controlled in the direction of the width of paper 504 which is fed out by a roller 503. The mechanism in FIG. 13 is mounted on an ink jet printer 510 shown in FIG. 14. Incidentally, the aforementioned ink jet head 400 can be mounted as a line head of a line printer. In that case, no carriage is required. Although description was made here about the ink jet head 400 which was of a type using a piezoelectric actuator for discharging an ink droplet in the edge direction, and the ink jet printer 510 using the ink jet head 400 by way of example, similar configuration is made also in the case where used is the aforementioned ink jet head 60 which is of a type using an electrostatic actuator according to Embodiment 7 for discharging an ink droplet from the face side.

Embodiment 9

Figure 15:
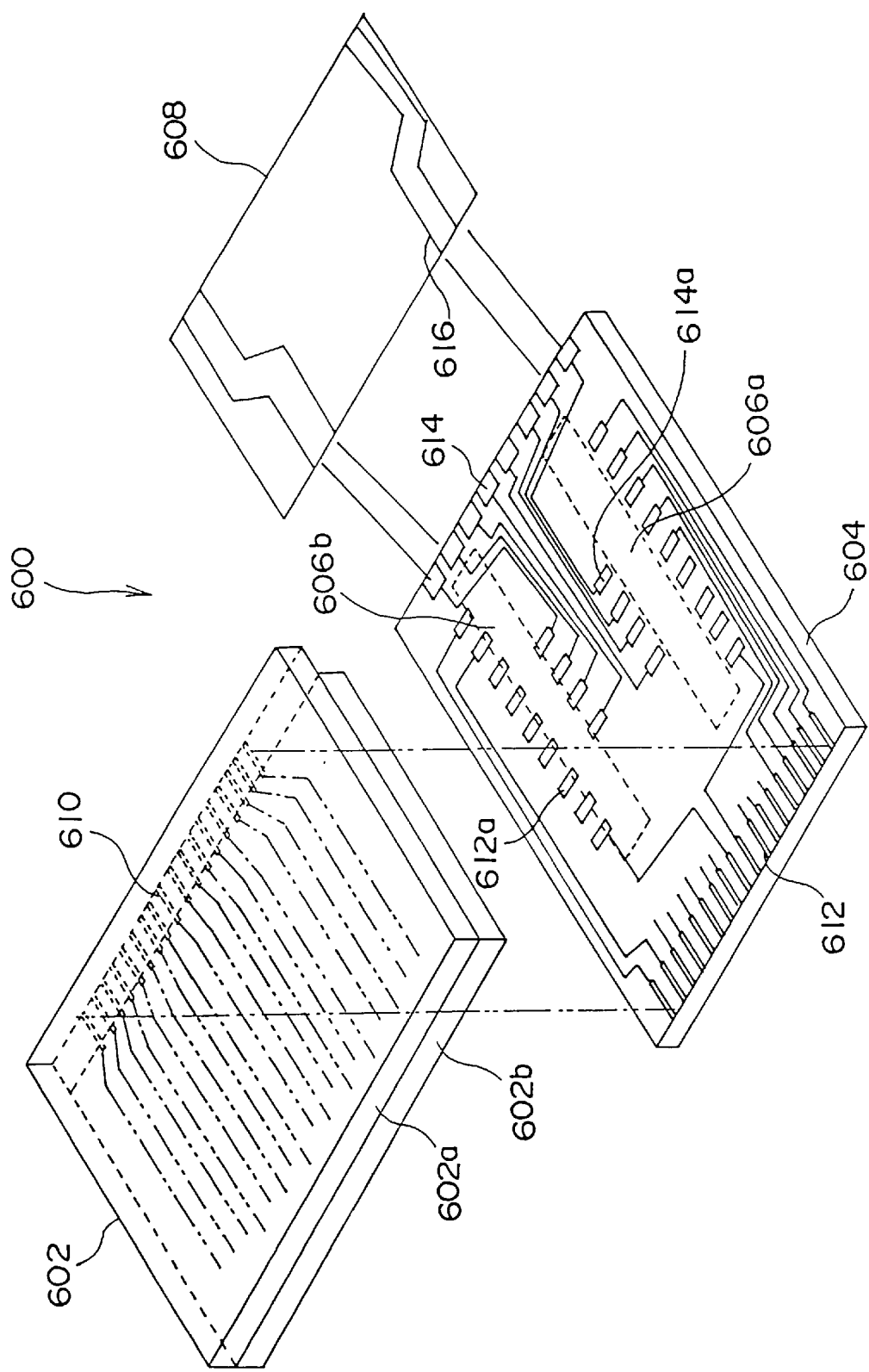
FIG. 15 is an explanatory view showing a liquid crystal device according to Embodiment 9 of the present invention.

FIG. 15 is an explanatory view showing a liquid crystal device according to this embodiment, showing the state after completion of an array process and a cell process but before the stage of a module process, that is, before electronic circuits such as a driving system or the like are attached so as to be able to control a liquid crystal cell electrically.

A liquid crystal device 600 has a liquid crystal cell 602 as a first substrate; a narrow-pitch connector 604 as a second substrate which is mounted with two semiconductor devices 606a and 606b so that the semiconductor devices 606a and 606b are disposed with their short sides at the tops, that is, the short sides of the semiconductor devices 606a and 606b are set to be substantially in parallel with the terminal alignment direction of the liquid crystal cell 602 which is a connection subject; and a flexible substrate 608. The respective semiconductor devices 606a and 606b are mounted in close contact with the substrate of the narrow-pitch connector 604 through an insulating layer. The liquid crystal cell 602 is formed by injecting and enclosing a liquid crystal material between a first substrate 602a and a second substrate 602b. Picture element electrodes, thin film transistors connected to the picture element electrodes, source lines and data lines electrically connected to the sources and gates of the thin film transistors, and so on, are formed on one of the substrates, that is, the first substrate 602a (the substrate located on the upper side in FIG. 15). On the other hand, for example, opposed electrodes, color filters, and so on, are disposed on the other substrate, that is, the second substrate 602b (the substrate located on the lower side in FIG. 15). In the module process, terminal electrodes (the pitch is not larger than 60 $\mu$m) 610 formed on the liquid crystal cell 602 and fine-pitch terminal electrodes (the pitch is not larger than 60 $\mu$m) 612 formed, through the insulating layer, on the surface of the narrow-pitch connector 604 as a third substrate, are put on top of each other, or these terminal electrodes 610 and 612 are put on top of each other through electrically conductive members. Then, the terminal electrodes 610 and 612 are connected with each other by pressing and heating. In addition, terminal electrodes (the pitch is not smaller than 80 $\mu$m) 614 at the end of a wiring pattern which is formed on the surfae of the narrow-pitch connector 604 through the insulating layer so as to be expanded and extended toward the other end of the narrow-pitch connector 604 opposite to the fine-pitch terminal electrodes 612, are connected with terminal electrodes 616 of the flexible substrate 608 respectively. Thus, the terminal electrodes 610 are made electrically conductive with the respective semiconductor devices 606a and 606b for driving the liquid crystal while the respective semiconductor devices 606a and 606b are made electrically conductive with the flexible substrate 608. That is, the other end portions 612a of the terminal electrodes 612 and the other end portions 614a of the terminal electrodes 614 are located in the electrode positions of the respective semiconductor devices 606a and 606b. Thus, when both the end portions 612a and 614a are connected with the electrodes of the semiconductor devices 606a and 606b respectively so that the terminals of the respective semiconductor devices 606a and 606b, the terminal electrodes 612 and the terminal electrodes 614 are made electrically conductive with one another.

Thus, the semiconductor devices 606a and 606b are disposed in tight contact with the surface of the narrow-pitch connector 604. Accordingly, when heat is generated in the semiconductor devices 606a and 606b, this generated heat is transferred to the substrate, and the substrate plays the role of a radiator plate (heat sink). As a result, even if the heating values of the respective semiconductor devices 606a and 606b increase, the substrate efficiently radiates the heat generated in the semiconductor devices 606a and 606b, so that it is possible to drive the semiconductor devices 606a and 606b stably.

Further, the semiconductor devices 606a and 606b are held by the substrate, and the electrodes provided in the respective semiconductor devices 606a and 606b are connected with the terminal electrodes 612a and 614a formed tightly on the surface of the substrate. Thus, even if external force is applied to the semiconductor devices 606a and 606b, it is possible to restrain a failure in connection in comparison with the background-art method using a tape carrier package.

In addition, because the semiconductor devices 606a and 606b are mounted inside the substrate, mounting of the semiconductor devices 606a and 606b becomes unnecessary in front of or at rear of the narrow-pitch connector 604, that is, on the liquid crystal cell 602 or the flexible substrate 608. As a result, it is possible to reduce the mounting area.

In addition, the semiconductor devices 606a and 606b may be disposed so that the short sides of the semiconductor devices 606a and 606b are substantially in parallel with the terminal alignment direction of the liquid crystal cell 602. On the contrary, the semiconductor devices 606a and 606b may be disposed so that the long sides of the semiconductor devices 606a and 606b become substantially in parallel with the terminal alignment direction of the connecting subject 706. In the former case, the width of the narrow-pitch connector 604 can be reduced in comparison with the width-direction size of the liquid crystal cell 602, so that assembling becomes easy.

Thus, by providing the narrow-pitch connector 604 as the third substrate separately, the area occupied by the terminal electrodes 610 in the liquid crystal cell 602 can be minimized. As a result, a large display portion in the liquid crystal cell can be ensured even if the liquid crystal cell has the same area as that of a background-art one. In addition, because the connection can be achieved with a narrow pitch, the number of terminals in a connection portion can be increased. Accordingly, the wiring pitch and the picture element pitch can be reduced, so that high precision can be obtained. Further, if the narrow-pitch connector 604 is formed from a material the thermal expansion coefficient of which is substantially equal to or smaller than that of the material of the liquid crystal cell 602, the thermal expansion coefficient of the narrow-pitch connector 604 becomes substantially equal to or smaller than that of the liquid crystal cell 602 when the terminal electrodes 610 are bonded with the terminal electrodes 612 of the narrow-pitch connector 604 which is to be bonded with the terminal electrodes 610. The terminal electrodes 610 and 612 can be prevented from relative positional deviation from each other when both the terminal electrodes are bonded with each other.

Incidentally, in the case where an anisotropic conductive bonding agent containing electrically conductive members, that is, electrically conductive particles, or an anisotropic conductive film in which the anisotropic conductive bonding agent is formed into a thin film, is put between the terminal electrodes 610 of the liquid crystal cell 602 and the terminal electrodes 612 of the narrow-pitch connector 604 when both the terminal electrodes are bonded with each other, these terminal electrodes to be connected with each other are brought into tight contact through the anisotropic conductive bonding agent or the anisotropic conductive film. On the contrary, in the case where such an anisotropic conductive bonding agent or such an anisotropic conductive film is not interposed, the terminal electrodes to be connected with each other are metal-bonded by use of welding or contact bonding.

Embodiment 10

Figure 16:
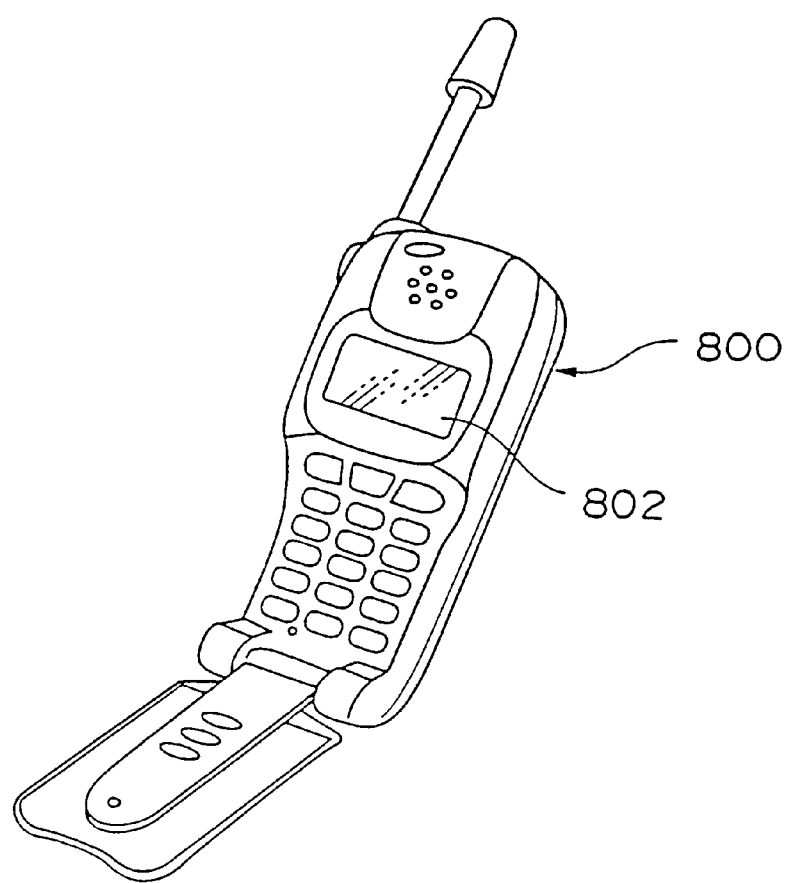
FIG. 16 is an explanatory view showing a portable telephone which is an example of electronic equipment using the liquid crystal device according to Embodiment 10 of the present invention.
Figure 17:
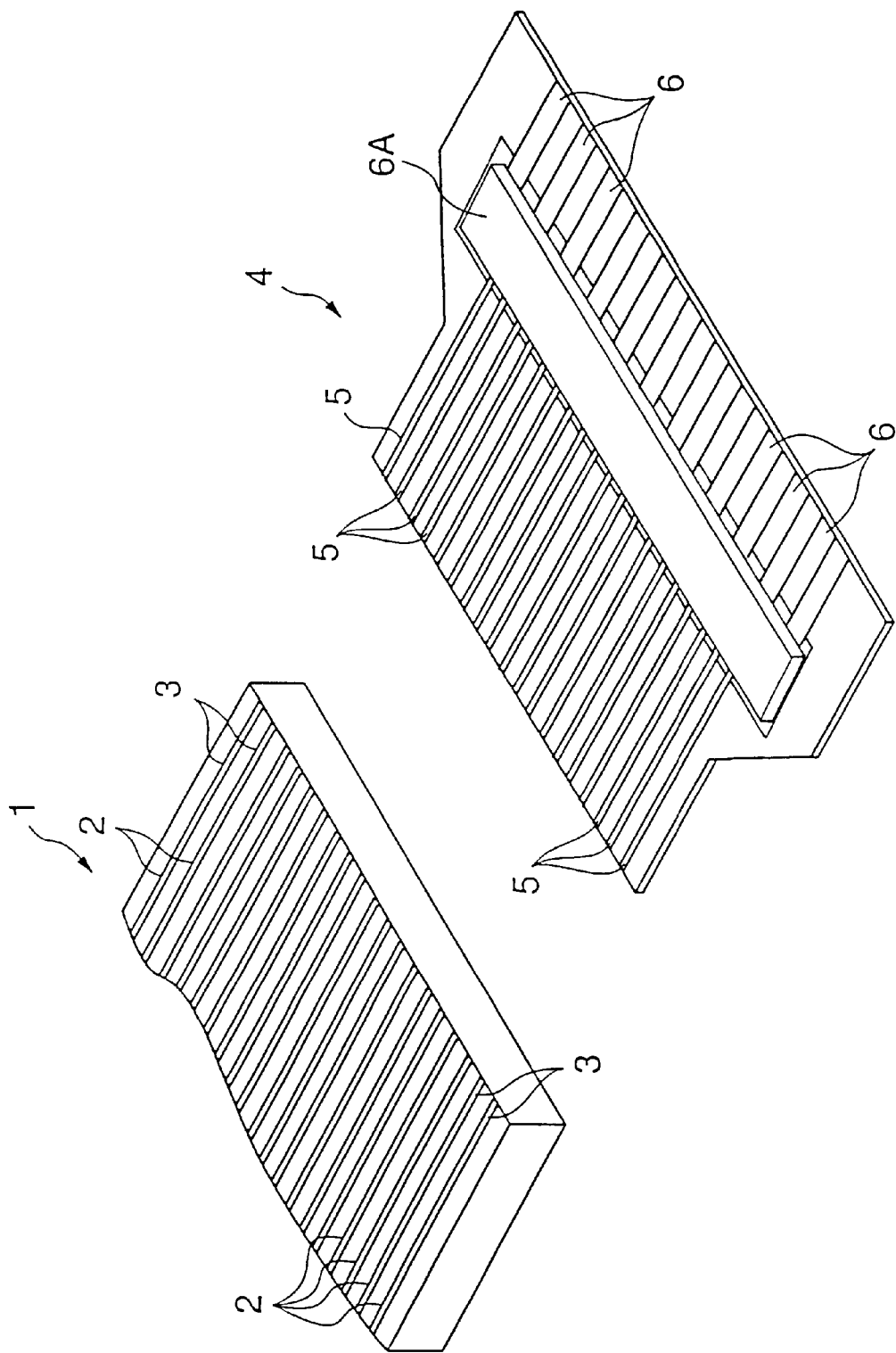
FIG. 17 is an enlarged view of a main portion of a connecting subject and a connector constituted by a flexible substrate in the background art.
Figure 18:
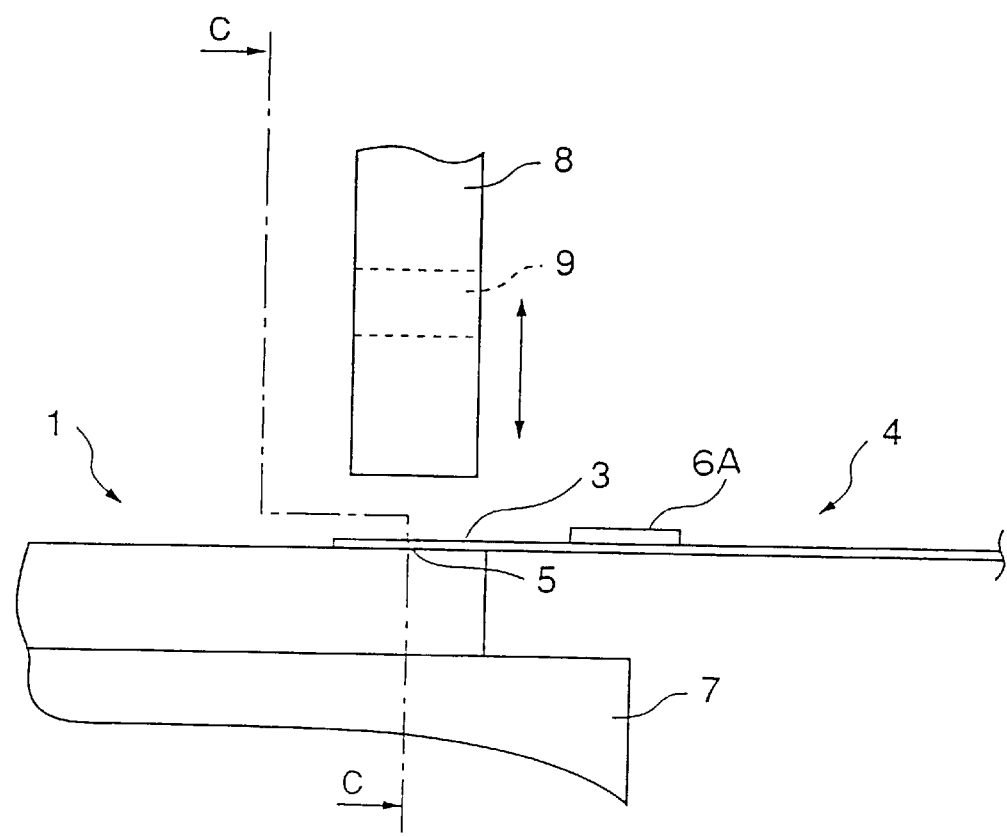
FIG. 18 is an explanatory view showing the process for connecting the connecting subject with the connector in the background art.
Figure 19:
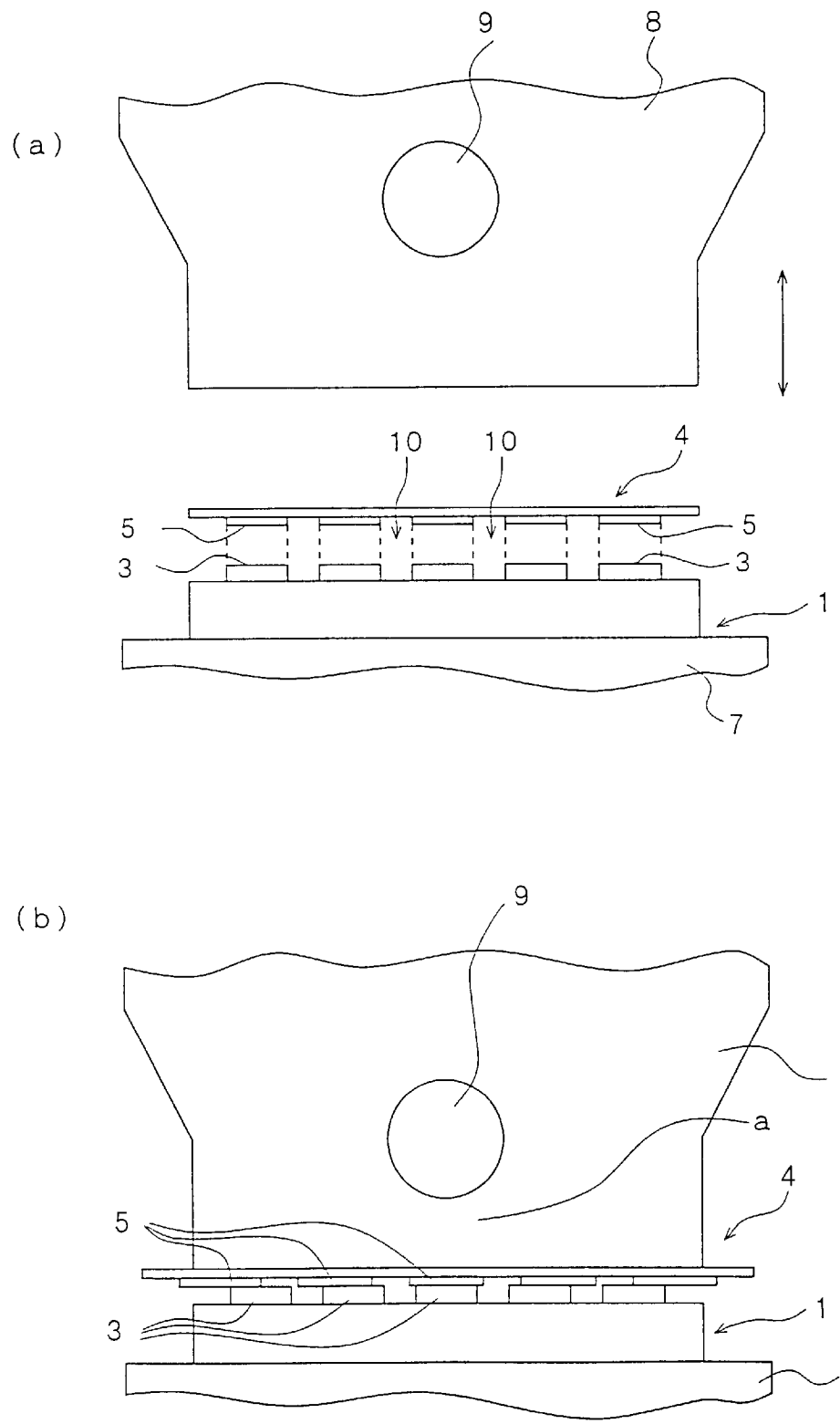
FIG. 19(a) and FIG. 19(b) are sectional views taken on line C—C in FIG. 18, showing the process for connecting the connecting subject with the connector in the background art.

FIG. 16 shows a portable telephone which is an example of electronic equipment using the liquid crystal device shown in Embodiment 9.

The liquid crystal device is used in a display portion 802 of a portable telephone 800 shown in FIG. 16. Accordingly, the picture element pitch of the liquid crystal device can be reduced by use of the narrow-pitch connector mounted with the semiconductor devices for driving the liquid crystal so that a liquid crystal device with high precision can be obtained. As a result, the portable telephone 800 with the display portion 802 easy to view can be realized though it is small in size.

What is claimed is:

1. A connector comprising a substrate having a plurality of first terminal electrodes which are formed on a surface of the substrate, the plurality of first terminal electrodes are in contact with the surface through an insulating layer and are arranged along an edge of the substrate, and a plurality of second terminal electrodes which are formed on the surface, the plurality of second terminal electrodes are in contact with the surface through an insulating layer and are arranged along another edge of the substrate, wherein a pitch of said first terminal electrodes is narrower than a pitch of said second terminal electrodes and the number of said first terminal electrode is larger than the number of said second electrodes, wherein:

said substrate is formed of silicon;

an insulating layer is formed on the surface in contact therewith;

a first wiring and a second wiring extended from and connected with said first and second terminal electrodes respectively, and a semiconductor device electrically connected with said first and second wirings, are disposed on said insulating layer in close contact therewith.

2. A connector according to claim 1, wherein said semiconductor device is disposed so that long sides of said semiconductor device are put substantially in parallel with an alignment direction of said first terminal electrodes.

3. A connector according to claim 1, wherein said semiconductor device is disposed so that short sides of said semiconductor device are put substantially in parallel with an alignment direction of said first terminal electrodes.

4. A pitch converter comprising:

a connector according to claim 1, and a connecting subject having external terminal electrodes electrically connected with said first terminal electrodes.

5. A pitch converter according to claim 4, wherein said connecting subject has a thermal expansion coefficient that is substantially equal to or larger than a thermal expansion coefficient of said substrate.

6. A pitch converter according to claim 4, wherein said connecting subject is formed of silicon.

7. A pitch converter according to claim 4, wherein said first terminal electrodes are electrically connected with said external electrodes through electrically conductive members.

8. A micro-machine comprising: a connector according to claim 1; and a connecting substrate having a moving mechanism portion and a plurality of external terminal electrodes to be connected to the first terminal electrodes of said connector.

9. A piezoelectric actuator: a connector according to claim 1; and a connecting substrate having a piezoelectric element and a plurality of external terminal electrode to be connected to the first terminal electrodes of said connector.

10. An electrostatic actuator comprising: a connector according to, claim 1; and a connecting substrate having an electrostatic vibrator and a plurality of external terminal electrodes to be connected to the first terminal electrodes of said connector.

11. An ink jet head comprising a piezoelectric actuator according to claim 9.

12. An ink jet head comprising an electrostatic actuator according to claim 10.

13. An ink jet printer comprising an ink jet head according to claim 11.

14. An ink jet printer comprising an ink jet head according to claim 12.

15. A liquid crystal device comprising: a connector according to claim 1; and a pair of connecting substrates having a liquid crystal held between the connecting substrates and a plurality of external terminal electrodes formed on one of said connecting substrates, to be connected to the first terminal electrodes of said connector.

16. An electronic equipment comprising a liquid crystal device according to claim 15.

* * * * *